United States Patent
Xu et al.

(10) Patent No.: US 12,069,544 B2
(45) Date of Patent: Aug. 20, 2024

(54) BROADCAST METHOD, APPARATUS, AND SYSTEM

(71) Applicant: HUAWEI TECHNOLOGIES CO., LTD., Guangdong (CN)

(72) Inventors: Shengfeng Xu, Beijing (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 360 days.

(21) Appl. No.: 17/677,744

(22) Filed: Feb. 22, 2022

(65) Prior Publication Data

US 2022/0182795 A1 Jun. 9, 2022

Related U.S. Application Data

(63) Continuation of application No. PCT/CN2020/110565, filed on Aug. 21, 2020.

(30) Foreign Application Priority Data

Aug. 23, 2019 (CN) .......................... 201910785975.2

(51) Int. Cl.
*H04W 4/06* (2009.01)
*H04W 88/04* (2009.01)

(52) U.S. Cl.
CPC .............. *H04W 4/06* (2013.01); *H04W 88/04* (2013.01)

(58) Field of Classification Search
None
See application file for complete search history.

(56) References Cited

U.S. PATENT DOCUMENTS

| 2013/0281110 | A1 | 10/2013 | Zelinka |
| 2020/0403687 | A1* | 12/2020 | Raghavan ............. H04W 8/005 |

FOREIGN PATENT DOCUMENTS

| CN | 103404202 A | 11/2013 |
| CN | 103686743 A | 3/2014 |
| CN | 103716803 A | 4/2014 |
| CN | 103747507 A | 4/2014 |
| CN | 105992157 A | 10/2016 |
| CN | 107040995 A | 8/2017 |
| CN | 109996306 A | 7/2019 |

(Continued)

OTHER PUBLICATIONS

3GPP TS 22.185 V15.0.0 (Jun. 2018), "3rd Generation Partnership Project; Technical Specification Group Services and System Aspects; Service requirements for V2X services; Stage 1 (Release 15)," Jun. 2018, 14 pages.

(Continued)

*Primary Examiner* — Suhail Khan
(74) *Attorney, Agent, or Firm* — Fish & Richardson P.C.

(57) ABSTRACT

The present disclosure describes a broadcast method, an apparatus, and a system. In one example, a broadcast decision apparatus obtains broadcast decision information of a plurality of terminals, where the broadcast decision information includes at least location information of the terminals. The broadcast decision apparatus selects some terminals from the plurality of terminals as relay terminals based on the broadcast decision information and a transmission range of data, and sends configuration information to the relay terminals to indicate the relay terminals to broadcast the data.

20 Claims, 11 Drawing Sheets

(56) References Cited

FOREIGN PATENT DOCUMENTS

WO      2016074137 A1      5/2016
WO      2018119667 A1      7/2018

OTHER PUBLICATIONS

Office Action issued in Chinese Application No. 201910785975.2 on Jan. 6, 2022, 30 pages (with English translation).
Office Action issued in Chinese Application No. 201910785975.2 on Jul. 6, 2021, 20 pages (with English translation).
PCT International Search Report and Written Opinion issued in International Application No. PCT/CN2020/110565 on Nov. 25, 2020, 13 pages (with English translation).
EPO Partial Supplementary European Search Report issued in European Application No. 20855966.6 on Aug. 19, 2022, 11 pages.

* cited by examiner

BROADCAST METHOD, APPARATUS, AND SYSTEM

CROSS-REFERENCE TO RELATED APPLICATIONS

This application is a continuation of International Application No. PCT/CN2020/110565, filed on Aug. 21, 2020, which claims priority to Chinese Patent Application No. 201910785975.2, filed on Aug. 23, 2019. The disclosures of the aforementioned applications are hereby incorporated by reference in their entireties.

TECHNICAL FIELD

This application relates to wireless communication technologies, and in particular, to a broadcast method, an apparatus, and a system.

BACKGROUND

Device-to-device (Device-to-Device, D2D) communication means that user data may be directly transmitted between terminal devices without traversing a wireless network, has prospects of improving system performance, improving user experience, and expanding wireless communication application, and attracts wide attention.

In the D2D communication, a terminal device may send an application message to other terminal devices in a broadcast manner. In single-hop broadcast, a terminal device at a transmit end distributes the application message to neighboring terminal devices, and a transmission range is limited. In multi-hop broadcast, a relay terminal device forwards the application message to farther terminal devices in a multi-hop form, to implement distribution of the application message in a larger range. In the foregoing multi-hop broadcast process, broadcast ranges may overlap severely, or broadcast coverage may not satisfy a requirement, and a problem such as information redundancy, channel contention, or collision interference may occur.

SUMMARY

Embodiments of the present invention provide a broadcast method, an apparatus, and a system, which are applicable to multi-hop broadcast. On one hand, a broadcast coverage requirement can be satisfied; on the other hand, information redundancy, channel contention, or collision interference can be reduced.

According to a first aspect, an embodiment of this application provides a broadcast method. The method includes: obtaining, by a first apparatus, broadcast decision information of a plurality of first terminals, where the broadcast decision information includes mobility information, and the mobility information is used to indicate locations of the first terminals; determining, by the first apparatus, a second terminal in the plurality of first terminals based on the broadcast decision information and a first range, where the first range is a transmission range of first data; and sending, by the first apparatus, configuration information to the second terminal, where the configuration information is used to indicate the second terminal to broadcast the first data. The second terminal may be referred to as a relay terminal.

According to the method in the first aspect, the first apparatus collects location information of terminals, and selects the relay terminal with reference to a transmission range of data and locations of the terminals, and may select a relay terminal that matches the transmission range of the data in multi-hop broadcast. This can satisfy a broadcast coverage requirement, and can also avoid broadcast flooding, and reduce information redundancy, channel contention, or collision interference.

In an optional design, the first apparatus may be a terminal, a core network element, or a base station. Alternatively, the first apparatus may be an independent network element deployed in an access network or a core network. Alternatively, the first apparatus may be a system apparatus including a plurality of network elements, and the plurality of network elements may respectively implement the obtaining step, the determining step, and the sending step in the foregoing method.

In an optional design, the first apparatus may obtain the broadcast decision information from different sources. For example, the first apparatus may obtain the broadcast decision information from a network element that stores the broadcast decision information. For another example, the broadcast decision information may be distributed and stored on different network elements, and the first apparatus may obtain the broadcast decision information from the different network elements. For still another example, a terminal may report the broadcast decision information, and the first apparatus may receive the broadcast decision information from the terminal.

In an optional design, the determining, by the first apparatus, a second terminal in the plurality of first terminals based on the broadcast decision information and a first range includes: determining, by the first apparatus, a plurality of third terminals and connectivity between the plurality of third terminals in the plurality of first terminals based on the broadcast decision information and the first range, where the connectivity is related to locations of the plurality of third terminals; and selecting, by the first apparatus, some third terminals from the plurality of third terminals as second terminals based on the connectivity. An appropriate relay terminal can be more accurately selected by considering connectivity between terminals when the relay terminal is to be determined.

In an optional design, the determining, by the first apparatus, a second terminal in the plurality of first terminals based on the broadcast decision information and a first range includes: determining, by the first apparatus in the plurality of first terminals based on the broadcast decision information and the first range, a graph that includes a plurality of third terminals, where a plurality of vertexes of the graph represent the plurality of third terminals, a plurality of edges of the graph represent connectivity between the plurality of third terminals, and the connectivity is related to locations of the plurality of third terminals; and determining, by the first apparatus, the second terminal in the graph according to a graph algorithm. Optionally, weights of the plurality of edges represent overheads of the connectivity, and the overheads are related to the locations of the plurality of third terminals. Optionally, the graph algorithm may be a shortest path algorithm. Optionally, the second terminal is an intermediate node of a path corresponding to the graph. Optionally, the graph algorithm may be a spanning tree algorithm. Optionally, the second terminal is an intermediate node of a spanning tree corresponding to the graph. Optionally, the shortest path algorithm may include a Dijkstra's algorithm or a Floyd-Warshall algorithm. Optionally, the spanning tree algorithm may include a breadth-first spanning tree algorithm or a minimum spanning tree algorithm. Optionally, the minimum spanning tree algorithm may include a Prim's algorithm or a Kruskal's algorithm. An appropriate relay terminal can be more accurately selected by introducing the graph concept and algorithm to select the relay terminal.

The appropriate relay terminal is accurately selected, so that a relatively small quantity of relay terminals can be used to satisfy the broadcast coverage requirement, and the relay terminal can implement a relay broadcast requirement by using a relatively low transmit power. Therefore, the information redundancy, the channel contention, or the collision interference is further reduced while the broadcast coverage requirement is satisfied.

In an optional design, the broadcast decision information further includes terminal capability information, where the terminal capability information is used to indicate communication coverage of the first terminals. Optionally, the terminal capability information includes the communication coverage of the first terminals or transmit powers of the first terminals. Optionally, the terminal capability information may be used to determine connectivity between the terminals or overheads of the connectivity. Accuracy of determining the connectivity between the terminals or the overheads of the connectivity can be improved by considering the communication coverage of the terminals.

In an optional design, the broadcast decision information further includes channel quality information, where the channel quality information is used to indicate channel quality between the plurality of first terminals. Optionally, the channel quality information may be used to determine the connectivity between the terminals or the overheads of the connectivity. Accuracy of determining the connectivity between the terminals or the overheads of the connectivity can be improved by considering channel quality between the terminals.

In an optional design, the mobility information further includes movement directions or movement speeds of the first terminals. The locations of the terminals during broadcast may be determined by using the movement directions or the movement speeds. Accuracy of determining the connectivity between the terminals or the overheads of the connectivity can be improved by considering the movement directions or the movement speeds.

In an optional design, the configuration information includes a first identifier, and the first identifier is used to identify to-be-broadcast data; and the first data carries the first identifier. Optionally, the first identifier may be a data flow identifier of the data. Because different application messages may have a same broadcast coverage requirement, the determined relay terminal may be reused for the different application messages by using the identifier, to avoid repeatedly determining the relay terminal for the different application messages having the same broadcast coverage requirement. Optionally, that the first data carries the first identifier includes: The first data includes the first identifier, or the first data is scrambled by using the first identifier.

In an optional design, the method further includes: obtaining, by the first apparatus, the first identifier from a broadcast initiating terminal.

In an optional design, the method further includes: allocating, by the first apparatus, the first identifier or obtaining the first identifier from a broadcast control network element; and sending, by the first apparatus, the first identifier to a broadcast initiating terminal.

In an optional design, the method further includes: obtaining, by the first apparatus from the broadcast initiating terminal, information used to indicate the first range. Optionally, the information used to indicate the first range includes an application identifier, a data type, or data importance. The first range may be obtained by using a correspondence between the application identifier, the data type, or the data importance and the transmission range. Optionally, the information used to indicate the first range may be the first range.

In an optional design, the first apparatus receives a first request from the broadcast initiating terminal, where the first request is used to request to broadcast the first data. Optionally, the first request may include the first identifier or the information used to indicate the first range.

In an optional design, the broadcast initiating terminal has permission to request to broadcast the first data. The first apparatus may authenticate the broadcast initiating terminal to determine whether the broadcast initiating terminal has the permission to request to broadcast the first data.

In an optional design, the second terminal has permission to broadcast the first data. The first apparatus may authenticate the second terminal to determine whether the second terminal has the permission to broadcast the first data.

In an optional design, the method further includes: obtaining, by the first apparatus, updated broadcast decision information; determining, by the first apparatus based on the updated broadcast decision information, whether to update the second terminal; and determining a new second terminal based on the updated broadcast decision information and the first range if the first apparatus determines to update the second terminal.

According to a second aspect, an embodiment of this application provides a broadcast method, including: generating, by a first terminal, broadcast decision information, where the broadcast decision information is used to determine whether the first terminal broadcasts data having a specific transmission range, the broadcast decision information includes mobility information, and the mobility information is used to indicate a location of the first terminal; and sending, by the first terminal, the broadcast decision information to a first apparatus.

Whether a terminal is used as a relay terminal to broadcast data may be determined with reference to a transmission range of the data and a location of the terminal by reporting the location of the terminal by the terminal. This facilitates selection of a relay terminal that matches the transmission range of the data in multi-hop broadcast. This can satisfy a broadcast coverage requirement, and can also avoid broadcast flooding, and reduce information redundancy, channel contention, or collision interference.

In an optional design, the method further includes: receiving, by the first terminal, configuration information from a second apparatus, where the configuration information is used to indicate the first terminal to broadcast first data whose transmission range is a first range. Optionally, the second apparatus and the first apparatus may be a same device.

In an optional design, the configuration information includes a first identifier, and the first identifier is used to identify to-be-broadcast data; and the first data carries the first identifier. Because different application messages may have a same broadcast coverage requirement, the determined relay terminal may be reused for the different application messages by using the identifier, to avoid repeatedly determining the relay terminal for the different application messages having the same broadcast coverage requirement.

In an optional design, the broadcast decision information further includes terminal capability information, where the terminal capability information is used to indicate communication coverage of the first terminal.

In an optional design, the broadcast decision information further includes channel quality information, where the channel quality information is used to indicate channel quality between the first terminal and another terminal.

In an optional design, the mobility information further includes a movement direction or a movement speed of the first terminal.

For specific descriptions of the designs listed in the second aspect, refer to related content in the first aspect. Other designs in the first aspect are also applicable to the second aspect.

According to a third aspect, an embodiment of this application provides a broadcast method, including: sending, by a first terminal, a first request to a first apparatus, where the first request is used to request to broadcast first data whose transmission range is a first range; receiving, by the first terminal from the first apparatus, a first response in response to the first request, where the first response is used to indicate to broadcast the first data; and broadcasting, by the first terminal, the first data.

In an optional design, the first request includes a first identifier, and the first identifier is used to identify to-be-broadcast data; and the first data carries the first identifier.

In an optional design, the first response includes a first identifier, and the first identifier is used to identify to-be-broadcast data; and the first data carries the first identifier.

In an optional design, the first request includes information used to indicate the first range.

For specific descriptions of the designs listed in the third aspect, refer to related content in the first aspect. Other designs in the first aspect are also applicable to the second aspect.

According to a fourth aspect, an embodiment of this application provides a communication apparatus, configured to implement the method in the first aspect. The communication apparatus may be the first apparatus in the first aspect or a device including the first apparatus. The communication apparatus includes a corresponding module, unit, or means (means) for implementing the foregoing method. The module, unit, or means may be implemented by using hardware or software, or implemented by hardware executing corresponding software. The hardware or the software includes one or more modules or units corresponding to the foregoing functions.

According to a fifth aspect, an embodiment of this application provides a communication apparatus, configured to implement the method in the second aspect. The communication apparatus may implement the functions of the first terminal in the second aspect. The communication apparatus includes a corresponding module, unit, or means (means) for implementing the foregoing method. The module, unit, or means may be implemented by using hardware or software, or implemented by hardware executing corresponding software. The hardware or the software includes one or more modules or units corresponding to the foregoing functions.

According to a sixth aspect, an embodiment of this application provides a communication apparatus, configured to implement the method in the third aspect. The communication apparatus may implement the functions of the first terminal in the third aspect. The communication apparatus includes a corresponding module, unit, or means (means) for implementing the foregoing method. The module, unit, or means may be implemented by using hardware or software, or implemented by hardware executing corresponding software. The hardware or the software includes one or more modules or units corresponding to the foregoing functions.

According to a seventh aspect, an embodiment of this application provides a communication apparatus, configured to implement functions of the communication apparatus in the fifth aspect and the communication apparatus in the sixth aspect. The communication apparatus in the seventh aspect includes a corresponding module, unit, or means (means) for implementing the foregoing functions. The module, unit, or means may be implemented by using hardware or software, or implemented by hardware executing corresponding software. The hardware or the software includes one or more modules or units corresponding to the foregoing functions.

According to an eighth aspect, an embodiment of this application provides a communication apparatus, including a processor. The processor is configured to read instructions from a memory, and run the instructions to implement the method in the first aspect. Optionally, the communication apparatus includes the memory. Optionally, the communication apparatus may be a chip.

According to a ninth aspect, an embodiment of this application provides a communication apparatus, including a processor. The processor is configured to read instructions from a memory, and run the instructions to implement the method in the second aspect. Optionally, the communication apparatus includes the memory. Optionally, the communication apparatus may be a chip.

According to a tenth aspect, an embodiment of this application provides a communication apparatus, including a processor. The processor is configured to read instructions from a memory, and run the instructions to implement the method in the third aspect. Optionally, the communication apparatus includes the memory. Optionally, the communication apparatus may be a chip.

According to an eleventh aspect, an embodiment of this application provides a communication apparatus, including a processor. The processor is configured to read instructions from a memory, and run the instructions to implement the methods in the second aspect and the third aspect. Optionally, the communication apparatus includes the memory. Optionally, the communication apparatus may be a chip.

According to a twelfth aspect, an embodiment of this application provides a computer-readable storage medium, including instructions. When the instructions are executed on a communication apparatus, the communication apparatus is enabled to implement any one of the foregoing methods.

According to a thirteenth aspect, an embodiment of this application provides a computer program product, including instructions. When the instructions are executed on a communication apparatus, the communication apparatus is enabled to implement any one of the foregoing methods.

According to a fourteenth aspect, an embodiment of this application provides a communication system, including the communication apparatus in the fourth aspect or the eighth aspect. Optionally, the communication system may further include the communication apparatus in the fifth aspect or the ninth aspect. Optionally, the communication system may further include the communication apparatus in the sixth aspect or the tenth aspect. Optionally, the communication system may further include the communication apparatus in the seventh aspect or the eleventh aspect.

For technical effects of the fourth aspect to the fourteenth aspect, refer to the beneficial effects of the first aspect to the third aspect.

DESCRIPTION OF EMBODIMENTS

Figure 1:
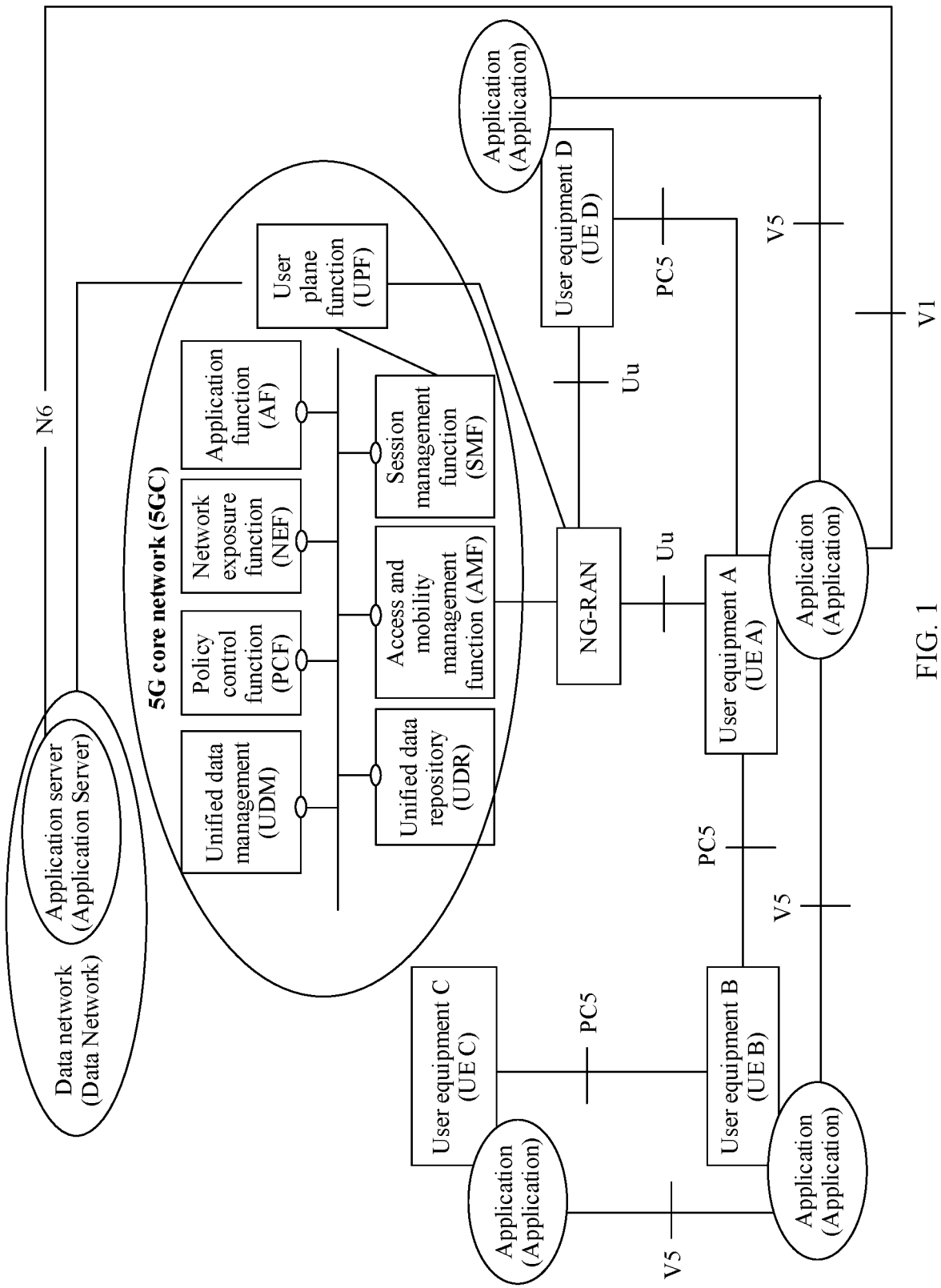
FIG. 1 is a schematic diagram of a communication system according to an embodiment of this application.

To make the objectives, technical solutions, and advantages of the embodiments of this application clearer, the following describes the technical solutions in the embodiments of this application with reference to the accompanying drawings in the embodiments of this application.

For ease of description, Table 1 lists English abbreviations, English full names in this application.

TABLE 1

| English abbreviation | Full expression in English/Standard term in English |
|---|---|
| AMF | Access and Mobility Management Function |
| SMF | Session Management Function |
| UPF | User Plane Function |
| PCF | Policy Control Function |
| NEF | Network Exposure Function |
| UDM | Unified Data Management |
| AF | Application Function |
| UDR | Unified Data Repository |
| RAN | Radio Access Network |
| NG-RAN | next generation radio access network |
| UE | User Equipment |
| DN | Data Network |
| ITS | Intelligent Transport Systems |
| RSU | Road Side Unit |
| V2X | vehicle to X |
| V2X | UE vehicle to X user equipment |
| IP | intern& protocol |
| QoS | quality of service |

TABLE 1-continued

| RSRP | reference signal received power |
|---|---|
| RSRQ | reference signal received quality |
| dBm | decibel-milliwatt |
| dB | decibel |
| GPS | global positioning system |
| English abbreviation | Full expression in English/Standard term in English |
| DD | |
| IMSI | international mobile subscriber identity |
| PEI | permanent equipment identifier |
| GMLC | gateway mobile location centre |
| SUPL | secure user plane location |
| SLP | SUPL Location Platform |

Unless otherwise specified, "I" in descriptions of this application represents an "or" relationship between associated objects. For example, A/B may represent A or B. A and B may be singular or plural. In addition, in the descriptions of this application, "a plurality of" means two or more than two, unless otherwise specified. "At least one of the following" or a similar expression thereof indicates any combination of these items, including a single item or any combination of plural items. For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, the word such as "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word "example", "for example", or the like is intended to present a relative concept in a specific manner for ease of understanding.

In the embodiments of this application, the technical solutions are described on a basis of performing D2D communication by using a 5G communication system. A person skilled in the art should know that the solutions in this application are applicable to performing D2D communication by using a 4G communication system. In addition, with evolution and change of communication technologies, the solutions in this application may also be applicable to performing D2D communication by using another communication system, for example, by using a 6G communication system.

FIG. 1 is a schematic diagram of an architecture of a 5G communication system. The communication system includes a core network and an access network. An access network may be an NG-RAN. A core network may include an AMF network element, an SMF network element, a UPF network element, a UDR network element, a UDM network element, and an AF network element. The UPF may be connected to a DN, and the DN includes an application server. UE establishes a connection to the DN by using the communication system, and an application of the UE may access the application server in the DN by using a logical interface, to obtain application data.

The UE is a terminal device, and has a wireless transceiver function. The terminal device may be a communication terminal, and includes a handheld device or a notebook computer; or may be another device that can access a network, and includes an RSU. A transport means, for example, a vehicle and an uncrewed aerial vehicle, may be used as a terminal device by carrying the foregoing communication terminal or deploying the wireless transceiver function on the transport means. The terminal device communicates with an access network device by using an air interface technology. Alternatively, the terminal device may directly communicate with another terminal device.

A radio access network (Radio Access Network, RAN) device is a device that provides a wireless communication function for the terminal device. The network element is mainly used for radio resource management, quality of service management, and data compression and encryption on an air interface side. The access network device may be a next generation base station, an evolved NodeB, a radio network controller, a NodeB, a base station controller, a base transceiver station, a baseband unit, a transmission point, a transmit point, or the like in a 5G network. The BBU in the access network in the 5G network may be reconstructed into a centralized unit and a distributed unit. A CU device is mainly configured to process a wireless upper-layer protocol stack function, and can satisfy a higher network latency requirement of a future communication network for an emerging service such as virtual reality/augmented reality. A DU device is mainly configured to process a physical layer function and a function that has a relatively high requirement on real-time performance.

The AMF network element is a network element used for access and mobility management. The network element is mainly used for access control, mobility management, attachment and detachment, and SMF network element selection. When serving a session in the terminal device, the network element may provide a control-plane storage resource for the session, to store a session identifier, an SMF network element identifier associated with the session identifier, and the like. The network element may serve as an anchor of a signaling connection between N1 and N2, to provide routing of an N1/N2 SM message for the SMF.

The SMF network element is a network element used for session management. The network element is mainly configured to provide control-plane functions for session management, such as session creation, modification, and release. The network element may assign an IP address to a user and select and redirect the UPF network element.

The UPF network element is a network element used for user plane processing. The network element is mainly configured to process a user-plane service, for example, data packet routing and forwarding, and QoS mapping and execution. The network element may receive user data from the DN, and transmit the user data to the UE through the access network device. The network element may further receive user data from the UE through the access network device, and forward the user data to the DN. The SMF network element manages and controls a transmission resource and a scheduling function of the network element that serve the UE.

The UDM network element is a network element used for data management. The network element is mainly configured to generate an authentication parameter, store and manage an ID of a permanent user in a system, and perform registration management on a service network element of the user, for example, an AMF and an SMF that currently provide services for the terminal device.

The UDR network element is a network element used for unified data storage. The network element is mainly configured to store and retrieve subscription data, policy data, and public architecture data; and provide related data for a UDN network element, a PCF network element, and an NEF network element.

The AF network element is a network element used for an application service. The network element is mainly configured to interact with a core network to provide a service, for example, to affect a data routing decision, provide a policy control function, or provide some services of a third party for a network side.

The DN is a data network. The DN is mainly used to provide a service for the user, such as a service of an operator, an internet access service, and a third-party service. A vehicle to X application server may be deployed in the DN, and is configured to provide a vehicle to X application service for the terminal device.

In 5G-based D2D communication, terminal devices may communicate with each other in a direct link manner by using a PC5 interface. In addition, the terminal device and a base station may communicate with each other by establishing an uplink/downlink by using a Uu interface. The communication between the terminal devices in the direct link manner may be further classified into unicast, multicast, and broadcast based on a communication mode. The unicast is a one-to-one communication mode between the terminal devices, and a single terminal device receives unicast data. The multicast is a one-to-many communication mode between the terminal devices, and terminal devices that receive multicast data are in a specific group. The broadcast is a one-to-all communication mode between the terminal devices, and all terminal devices around a transmit end receive broadcast data. Broadcast manners include single-hop broadcast and multi-hop broadcast. The single-hop broadcast means directly distributing information to neighboring terminal devices, without a need for a relay terminal device to forward the information. In the multi-hop broadcast, the relay terminal device may broadcast the information to farther terminal devices in a multi-hop form, to implement distribution of the information in a larger range.

In this application, that a terminal device forwards received broadcast information in a broadcast manner may be referred to as relay broadcast, and the terminal device may be referred to as a relay terminal device. A start terminal of the multi-hop broadcast may be referred to as an initiating terminal device, and a terminal device that no longer performs relay broadcast on received broadcast information is referred to as an end terminal device. For ease of description, a terminal device may be referred to as a terminal for short.

Vehicle to X V2X (vehicle to X) is a key technology of an intelligent transportation system. The vehicle to X includes vehicle to vehicle (vehicle to vehicle, V2V) communication, vehicle to infrastructure (vehicle to infrastructure, V2I) communication, vehicle to network (Vehicle to Network, V2N) communication, and vehicle to pedestrian (Vehicle to pedestrian, V2P) communication. A D2D technology may be applied to the vehicle to X, to implement transmission of a vehicle to X application message between terminal devices. The vehicle to X includes a plurality of scenarios such as collision warning, vehicle out-of-control warning, and pedestrian collision prevention. Some applications need to broadcast specific messages. One vehicle to X application message corresponds to one transmission range, a terminal device in the transmission range needs to receive the application message, and different vehicle to X application messages may correspond to a same transmission range.

Based on the foregoing D2D communication, this application provides a plurality of embodiments to describe in detail the technical solutions in this application.

Embodiment 1

Figure 2:
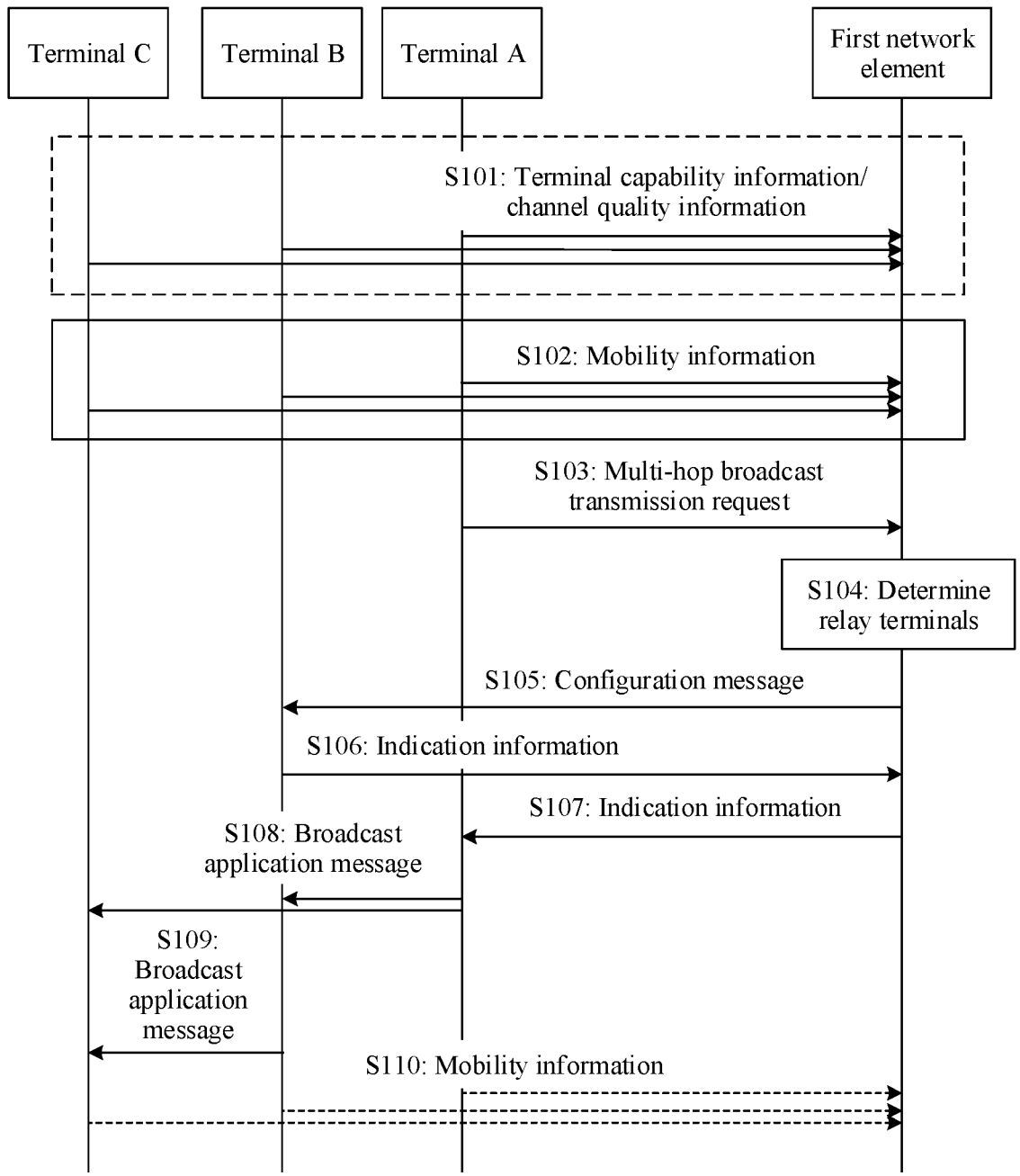
FIG. 2 is a schematic flowchart of a broadcast method according to an embodiment of this application.

Embodiment 1 describes a process of performing multi-hop broadcast by using the technical solutions in this application in D2D communication. An application message of an initiating terminal is forwarded by one or more relay terminals, and is notified to terminal devices in a transmission range of the application message in a multi-hop broadcast manner. As shown in FIG. 2, this embodiment includes the following steps.

S101: Terminals send terminal capability information or channel quality information to a first network element.

Three terminals (a terminal A, a terminal B, and a terminal C) shown in FIG. 2 are used as an example, and do not constitute a limitation on a quantity of terminals.

The terminal capability information is used to indicate communication coverage capabilities of the terminals, and the channel quality information is used to indicate radio channel quality between the terminals. Communication coverage is a representation of the communication coverage capabilities.

In S101, the terminals may send either or both of the terminal capability information and the channel quality information to the first network element. The terminals may send the terminal capability information and the channel quality information by using a same message or same signaling, or may send the terminal capability information and the channel quality information by using different messages or signaling. The terminals may directly send the terminal capability information or the channel quality information to the first network element, or may forward the terminal capability information or the channel quality information to the first network element by using another network element. In a process of forwarding the terminal capability information or the channel quality information, a data structure or a representation form of the terminal capability information or the channel quality information may change.

The first network element may store the obtained terminal capability information or channel quality information locally or in another network element.

It should be noted that, step S101 is an optional step. In a subsequent procedure, if the terminal capability information or the channel quality information needs to be used, default values of the terminal capability information or the channel quality information may be used. The default values may be specified in a communication protocol, or may be preconfigured.

Optionally, the terminal capability information includes the communication coverage or transmit powers. The communication coverage may be used to indicate communication ranges that the terminals can cover. The transmit powers may also be used to indicate the communication ranges that the terminals can cover.

Optionally, the channel quality information includes RSRPs or RSRQ, and the channel quality information may be obtained by measuring signals between the terminals.

Optionally, the terminals may periodically send the terminal capability information or the channel quality information, send the terminal capability information or the channel quality information through event triggers, or send the terminal capability information or the channel quality information according to indications of other network elements. For example, the event triggers may be that changes of channel quality between the terminals exceed a threshold, movement speeds exceed a threshold, or the like.

In an example, in vehicle to X application, six terminals that participate in vehicle to X communication are V2X UE #1, V2X UE #2, V2X UE #3, V2X UE #4, V2X UE #5, and V2X UE #6. Terminal capability information (communication coverage and transmit powers) of the terminals may be shown in Table 2. A correspondence between power values and the communication coverage of the terminal devices is not limited in this embodiment of this application.

TABLE 2

| V2X UE | Power value (dBm) | Coverage (radius, m) |
|---|---|---|
| V2X UE #1 | 13 | 300 |
| V2X UE #2 | 15 | 320 |
| V2X UE #3 | 10 | 260 |
| V2X UE #4 | 8 | 240 |
| V2X UE #5 | 12 | 280 |
| V2X UE #6 | 12 | 280 |

Channel quality information (using RSRQ as an example) of each terminal device is shown in each row in Table 3. The RSPQ values in each row indicate quality of signals received by the V2X UE from other V2X UE, where a unit is dB. A higher value indicates better radio channel quality.

TABLE 3

| | Transmit end | | | | | |
|---|---|---|---|---|---|---|
| Receive end | V2X UE #1 | V2X UE #2 | V2X UE #3 | V2X UE #4 | V2X UE #5 | V2X UE #6 |
| V2X UE #1 | | −9.2 | −16.6 | −15.2 | −18.0 | −10.5 |
| V2X UE #2 | −10.3 | | −16.7 | −16.4 | −15.3 | −16.2 |
| V2X UE #3 | −10.6 | −9.2 | | −11.5 | −15.1 | −16.5 |
| V2X UE #4 | −12.1 | −9.4 | −9.1 | | −8.1 | −18.0 |
| V2X UE #5 | −13.1 | −10.3 | −14.2 | −9.0 | | −18.6 |
| V2X UE #6 | −10.8 | −16.2 | −18.4 | −18.5 | −18.6 | |

The terminals may separately send the terminal capability information shown in Table 2 or the channel quality information shown in Table 3 to the first network element.

S102: The terminals send mobility information to the first network element.

The mobility information is used to indicate locations of the terminals. Optionally, the mobility information may include the locations of the terminals. Optionally, the mobility information may further include movement speeds of the terminals, movement directions of the terminals, or both the movement speeds and the movement directions. The locations of the terminals may be more accurately indicated by using the movement speeds or the movement directions of the terminals. An expression manner of the locations of the terminals is not limited in this application, and may be relative locations or absolute locations. For example, the locations of the terminals may be expressed by using two-dimensional coordinate information, three-dimensional coordinate information, information about roads on which the terminal devices are located, or a combination thereof.

The first network element may store the obtained mobility information locally or in another network element. The terminals may periodically send the mobility information, send the mobility information through event triggers, or send the mobility information according to indications of other network elements. This is similar to sending of the terminal capability information or the channel quality information in S101 For example, the terminals may send the mobility information based on lane changes, movement location changes exceeding a specified range, movement speed changes exceeding a specified range, or changes of the movement directions of the terminal devices.

A time sequence relationship between S102 and S101 is not limited.

In an example, two-dimensional coordinate location information of the terminal devices is shown in Table 4.

TABLE 4

| Terminal device | GPS coordinates (DD) |
| --- | --- |
| V2X UE #1 | (30.9399243310, 121.6845703125) |
| V2X UE #2 | (30.9902406160, 121.7307879743) |
| V2X UE #3 | (30.9913561602, 121.6300692801) |
| V2X UE #4 | (31.0102800916, 121.6420383940) |
| V2X UE #5 | (31.0219439754, 121.6551039066) |
| V2X UE #6 | (30.8839481029, 121.6359394543) |

Each terminal in Table 4 may send GPS coordinates of the terminal to the first network element.

S103: An initiating terminal (the terminal A) sends a multi-hop broadcast transmission request to the first network element.

As the initiating terminal, the terminal A may send the multi-hop broadcast transmission request to the first network element.

The multi-hop broadcast transmission request is used to request to broadcast an application message. The application message is one of pieces of data that may be broadcast.

Optionally, the broadcast transmission request may include a transmission range of the application message. Optionally, the broadcast transmission request may include an application identifier or an application type. The application identifier or the application type may be used to indicate the transmission range. For example, a transmission range of data requested to be broadcast may be learned of by using a correspondence between the application identifier or the application type and the transmission range. The correspondence may be stored in the first network element or another network element. Different applications may correspond to a same transmission range, and different application types may also correspond to a same transmission range. If the multi-hop broadcast transmission request does not include information used to indicate the transmission range, a default transmission range may be used as the transmission range of the data requested to be broadcast. The default transmission range may be specified in a communication protocol, or may be preconfigured. The application identifier may be represented by using, for example, an Application ID or a ProSe Application ID, and is represented by using a PSID or an ITS-AID in the vehicle to X application. Optionally, the terminal may obtain the transmission range from an application server based on the application identifier or the application type, or obtain the transmission range based on the correspondence between the transmission range and the application identifier or the application type.

In this application, the transmission range may be a value of a distance, or may be an area or a terrain. For example, the transmission range may be a circle represented by using a radius, a rectangle represented by using a length and a width, or the like.

Optionally, the broadcast transmission request includes a first identifier, and the first identifier is used to identify to-be-broadcast data. The first identifier may be obtained by a terminal (for example, the terminal A). There may be a plurality of manners of obtaining the first identifier.

In a first implementation, the terminal may generate the first identifier randomly or based on a terminal identifier. After generating the first identifier, the terminal may establish a correspondence between the first identifier and the transmission range, the application identifier, or the application type.

In a second implementation, the terminal may obtain the first identifier based on an existing correspondence between the first identifier and the transmission range, the application identifier, or the application type. The correspondence may be established by the terminal, established by the application server, or preconfigured. The correspondence may be stored in the terminal, the application server, or another network element.

In a third implementation, the terminal may obtain the first identifier from the application server. The application server may generate the corresponding first identifier based on the transmission range, the application identifier, or the application type. To ensure that first identifiers generated by a plurality of application servers are not duplicate in a specific range, different value ranges of the first identifiers may be configured for all application servers. The specific range may be a cell covered by a single RAN node, may be a tracking area including a plurality of cells, may be an administrative geographic district level (for example, Haidian District), or may be an administrative geographic municipality level. The range is not limited in this embodiment of this application. The terminal may obtain the first identifier from the application server, and may store a correspondence between the first identifier and the transmission range, the application identifier, or the application type.

Based on the correspondence between the first identifier and the transmission range, the application identifier, or the application type, the terminal may reuse the first identifier for broadcast of a same application, broadcast of a same application type, or broadcast of a same transmission range, to avoid that the first network element is repeatedly requested to determine the relay terminal for the broadcast of the same application, the broadcast of the same application type, or the broadcast of the same transmission range.

Optionally, the first identifier may be a data flow identifier. The data flow identifier may be represented by creating a flow ID value, a layer 2 address identifier (a source L2 ID, a destination L2 ID, or a combination thereof), a layer 3 address identifier (a source IP, a destination IP, or a combination thereof), or any combination of the layer 2 address identifier and the layer 3 address identifier. In an optional design, the flow ID value may be included in an IP packet header.

Optionally, the multi-hop broadcast transmission request may further include a terminal identifier of a first terminal device. Optionally, the terminal identifier may be used to verify whether the terminal device performs signatory delegation on a multi-hop broadcast transmission service, that is, whether the terminal device has permission to request to initiate broadcast. Optionally, the terminal identifier may be used to obtain mobility information of the terminal. The terminal identifier may be an IMSI, may be a PEI, or may be a 5G-S-TMSI. Optionally, whether the first terminal device performs signatory delegation on the multi-hop broadcast transmission service may be obtained from a core network when the first terminal device establishes a connection to the core network.

It should be noted that, if communication coverage of the initiating terminal is not less than the transmission range of the application message, multi-hop broadcast transmission request information may not be sent, and single-hop broadcast is performed. If communication coverage of the first terminal device is less than the transmission range of the application message, the multi-hop broadcast transmission request may be sent.

In an example, a flat tire occurs on the V2X UE #1. This may cause road congestion or collision with another vehicle, and a safety warning needs to be provided for a nearby vehicle. An application identifier of the security warning is represented by using a PSID, and a value is 32/0x20. A transmission range corresponding to the PSID is a circular area with a radius of 2000 meters, the correspondence is configured on the V2X UE #1, and a vehicle within 2000 meters away from the V2X UE #1 needs to receive the foregoing safety warning application message. The V2X UE #1 creates a flow ID, and a value is 00010100, corresponding to the transmission range. Broadcast coverage of the V2X UE #1 is a circular area with a radius of 1000 meters, and the V2X UE #1 sends a multi-hop broadcast transmission request to a VCF. In the request, a type of the transmission range of the application message is a circular area, and a value is 2000. The flow ID is 00001010. A type of the application identifier is the PSID, and the value is 32/0x20.

S104: The first network element selects relay terminals.

S104 may alternatively be expressed as that the first network element determines the relay terminals.

Specifically, the first network element may determine the relay terminals based on the mobility information in S102 and the transmission range of the application message in S103. Optionally, based on the mobility information in S102 and the transmission range of the application message in S103, the first network element may further determine the relay terminals based on the terminal capability information or the channel quality information in S101. In this application, the mobility information, the terminal capability information, and the channel quality information are broadcast decision information, and are used by the first network element to determine the relay terminals that perform relay broadcast.

In an implementation of S104, the first network element may determine, in the plurality of terminals based on the transmission range and the locations of the terminals, terminals that match the transmission range. For example, terminals in the transmission range are determined, or the terminals in the transmission range and terminals close to the transmission range and outside the transmission range are determined. After determining the terminals that match the transmission range, the first network element may select terminals with appropriate spacings from the terminals as the relay terminals based on location distribution of the terminals. A combination of broadcast coverage of the relay terminals can satisfy a requirement of the transmission range. When the relay terminals are determined, the relay terminals may be determined according to a rule of "using as few relay terminals as possible". It should be noted that there may be one or more determined relay terminals. In this implementation, the terminals may have connectivity by default.

In another implementation of S104, the first network element determines, based on the transmission range and the mobility information of the terminals, terminals that match the transmission range and connectivity between the terminals. The connectivity represents whether wireless communication can be performed between the terminal devices. For example, the connectivity may exist between the terminal devices by default, or a distance between the terminal devices may be obtained through calculation based on location information of the terminal devices, and whether the connectivity exists between the terminal devices is determined based on a specified threshold. The first network element determines, based on the connectivity between the terminal devices, some terminals in the terminals that match the transmission range as the relay terminals. In this manner, impact of terminal capability information or channel quality information on the connectivity may be considered.

In still another implementation of S104, it may be considered to determine the relay terminals by using a graph algorithm.

The first network element may determine, based on the transmission range and the broadcast decision information, a graph of terminals that match the transmission range. The terminals that match the transmission range serve as nodes or vertexes of the graph, an edge of the graph represents connectivity between terminals corresponding to nodes at two ends of the edge, and a weight of the edge represents overheads of the connectivity. Optionally, the graph may be a directed graph, where an edge in the directed graph points from a start point to an end point, and is referred to as a directed edge. Alternatively, the graph may be an undirected graph.

Optionally, whether an edge is established between nodes in the foregoing graph may be obtained through calculation based on mobility information. For example, when it is calculated based on the mobility information that a distance between two terminal devices is greater than a specified threshold, an edge is established between corresponding nodes in the foregoing graph. This may be understood as that the two nodes can be connected. Terminal capability information or channel quality information may also be considered during edge establishment.

Optionally, the weight of the edge may be obtained through calculation based on the mobility information of the terminal devices.

W=F1 (mob1, mob2).

W is the weight of the edge in the foregoing graph, F1 represents a function for calculating the weight, mob1 is broadcast decision information of a terminal 1, mob2 is broadcast decision information of a terminal 2, and the broadcast decision information includes mobility information. Optionally, the broadcast decision information further includes terminal capability information or channel quality information. A longer distance between two terminals may cause greater overheads of connectivity between the two terminals. When one terminal is located at an edge of communication coverage of the other terminal, the overheads of the connectivity may increase. When channel quality between the terminals deteriorates, the overheads of the connectivity may increase. That the overheads of the connectivity increase affects the weight.

Figure 3:
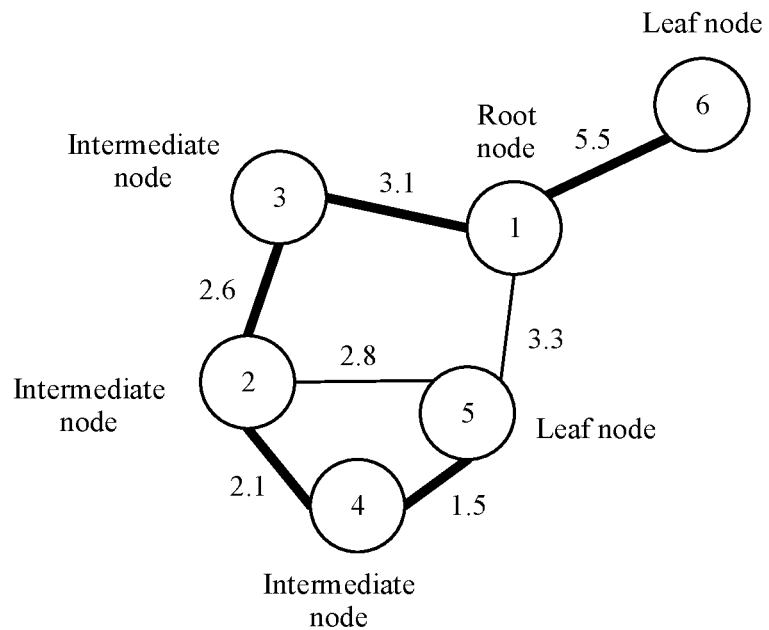
FIG. 3 is a schematic diagram of a spanning tree according to an embodiment of this application.
Figure 4:
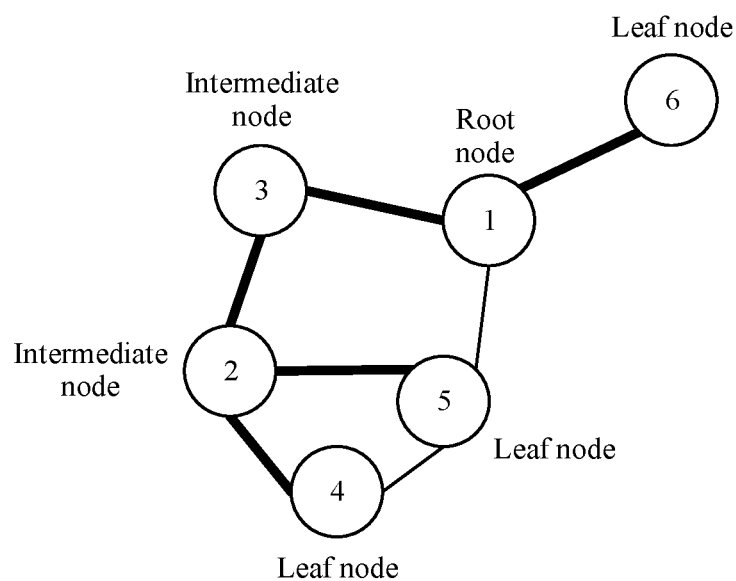
FIG. 4 is a schematic diagram of another spanning tree according to an embodiment of this application.

Optionally, the relay terminals may be selected from the foregoing graph according to a spanning tree algorithm of a graph theory. A top-layer node of a spanning tree is referred to as a root node, and a bottom-layer node is referred to as a leaf. Some or all intermediate nodes of the spanning tree may be selected as the relay terminals. For example, the initiating terminal is used as the root node of the spanning tree to establish a minimum spanning tree. As shown in FIG. 3, an intermediate node 2, an intermediate node 3, and an intermediate node 4 in the spanning tree may be selected as the relay terminals. For another example, a breadth-first spanning tree is established by using the initiating terminal as the root node. As shown in FIG. 4, an intermediate node 2 and an intermediate node 3 are selected as the relay terminals.

Figure 5:
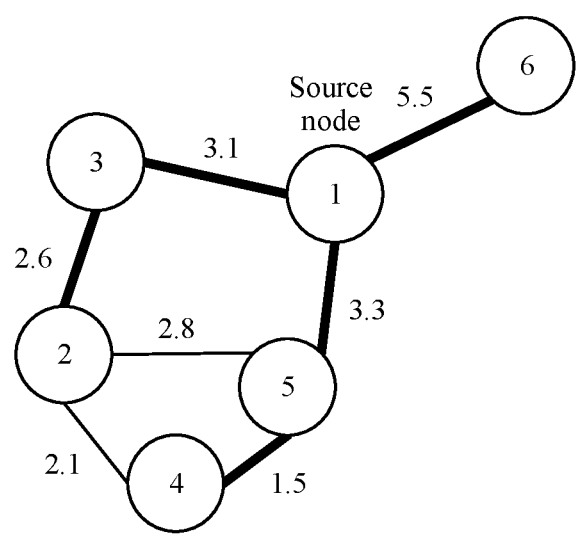
FIG. 5 is a schematic diagram of a path according to an embodiment of this application.

Optionally, the relay terminals are selected from the foregoing graph according to a shortest path algorithm of the graph theory. A start point of a path is referred to as a source node, an end point is referred to as an end point, and other nodes are referred to as intermediate nodes. For example, the initiating terminal is used as the source node, shortest paths between the source node and the other nodes are established, and a node 3 and a node 5 in the shortest paths are selected as the relay terminals, as shown in FIG. 5.

Optionally, the shortest path algorithm may include a Dijkstra's algorithm or a Floyd-Warshall algorithm. Optionally, the spanning tree algorithm may include a breadth-first spanning tree algorithm or a minimum spanning tree algorithm. Optionally, the minimum spanning tree algorithm may include a Prim's algorithm or a Kruskal's algorithm.

It should be noted that in this application, it is not excluded that a leaf node or the end point is determined as a relay terminal.

Optionally, the first network element obtains subscription information from a UDM network element or a UDR network element, and verifies whether the first terminal device performs signatory delegation on the multi-hop broadcast transmission service with the terminal devices in the transmission range of the application message. If verification of the first terminal device succeeds, the first network element selects the relay terminals from terminal devices that are in the transmission range of the application message and whose verification succeeds.

As shown in FIG. 2, the terminal B is determined as a relay terminal.

S105: The first network element sends a configuration message to the relay terminal (the terminal B).

The configuration message may be understood as configuration information.

The configuration message includes a first identifier, for example, a data flow identifier.

Optionally, the first network element is a core network element, and the first network element sends a NAS message to the relay terminal by using an AMF and a RAN node, where the message includes the foregoing configuration message.

Optionally, the first network element is a data plane network element, and the first network element sends the configuration message to the relay terminal by using a UPF and a RAN node. Optionally, if the foregoing configuration message is sent to the relay terminal by using the RAN node, and the RAN node may send the configuration message to the terminal devices in the transmission range of the application message in a broadcast form, the configuration message further includes an identifier of the relay terminal, so that the terminal device corresponding to information about the identifier learns that the terminal device needs to broadcast and forward an application message carrying the data flow identifier. Alternatively, the RAN node may send the configuration message to the relay terminal by using a unicast link, and the configuration message may not include an identifier of the relay terminal.

S106: The relay terminal (the terminal B) sends indication information to the first network element, to indicate that the relay terminal that sends the indication information has completed configuration based on the foregoing configuration message.

S107: The first network element sends indication information to the terminal A, where the indication information is used to indicate that the first network element has determined the relay terminal, and the relay terminal has completed configuration.

S108: The initiating terminal (the terminal A) broadcasts the application message.

The application message includes the first identifier in S103, for example, the data flow identifier.

Optionally, the first identifier may be included in an IP data packet header.

S109: The relay terminal (the terminal B) broadcasts the application message.

The relay terminal determines the received and broadcast application message, and broadcasts the application message if the first identifier included in the application message is consistent with the first identifier in the configuration information received by the relay terminal; otherwise, does not broadcast the application message. When broadcasting the application message, the relay terminal includes the first identifier in the application message, so that another relay terminal that receives the application message continues to perform determining and forwarding based on the first identifier included in the application message. In an example, the IP data packet header includes the first identifier.

Optionally, if a terminal device that is not a relay terminal in the transmission range receives the application message, the terminal device does not broadcast the application message.

Optionally, a broadcast message sent by the first terminal device and the broadcast message sent by the relay terminal may be sent in a same frequency band.

S110: The terminals update the mobility information, and sends updated mobility information to the first network element.

Optionally, the terminals may further report updated terminal capability information or channel quality information.

S110 may alternatively be expressed as: The terminal updates the broadcast decision information, and sends updated broadcast decision information to the first network element. The broadcast decision information includes the mobility information. Optionally, the broadcast decision information further includes the terminal capability information or the channel quality information.

The first network element determines whether a relay terminal whose broadcast decision information is updated can still cover the terminals in the transmission range of the application message, and maintains a current multi-hop broadcast manner if the relay terminal can still cover the terminals; or the first network element reselects a relay terminal and performs S104 if the relay terminal cannot cover the terminals.

Optionally, S110 may be performed at any moment. This is not limited in this embodiment of this application.

In this embodiment, the first network element may be a 5G data plane network element, and a terminal device may communicate with the first network element by using a RAN and the AMF. Alternatively, the first network element may be a 5G control plane network element, and a terminal device may communicate with the first network element by using a RAN and the UPF. Alternatively, the first network element may be a ProSe function network element; may be a ProSe control function network element; may be a VCF network element in vehicle to X application; may be a base station; may be an independent network element deployed on an access network or the core network; or may be a system apparatus including a plurality of network elements, where the plurality of network elements may separately implement some or all functions of the first network element in this embodiment.

Through S102, S104, and S105, the first network element may select the relay terminals with reference to the transmission range of the application message and the locations of the terminals, and may select the relay terminals that match the transmission range of the data in multi-hop broadcast. This can satisfy a broadcast coverage requirement, and can also avoid broadcast flooding, and reduce information redundancy, channel contention, or collision interference. Appropriate relay terminals can be more accurately selected by considering the connectivity between the terminals when the relay terminals are to be determined. The appropriate relay terminals can be more accurately selected by introducing the graph concept and algorithm to select the relay terminals. The appropriate relay terminals are accurately selected, so that a relatively small quantity of relay terminals can be used to satisfy the broadcast coverage requirement, and the relay terminals can implement a relay broadcast requirement by using relatively low transmit powers. Therefore, the information redundancy, the channel contention, or the collision interference is further reduced while the broadcast coverage requirement is satisfied.

Embodiment 2

Figure 6:
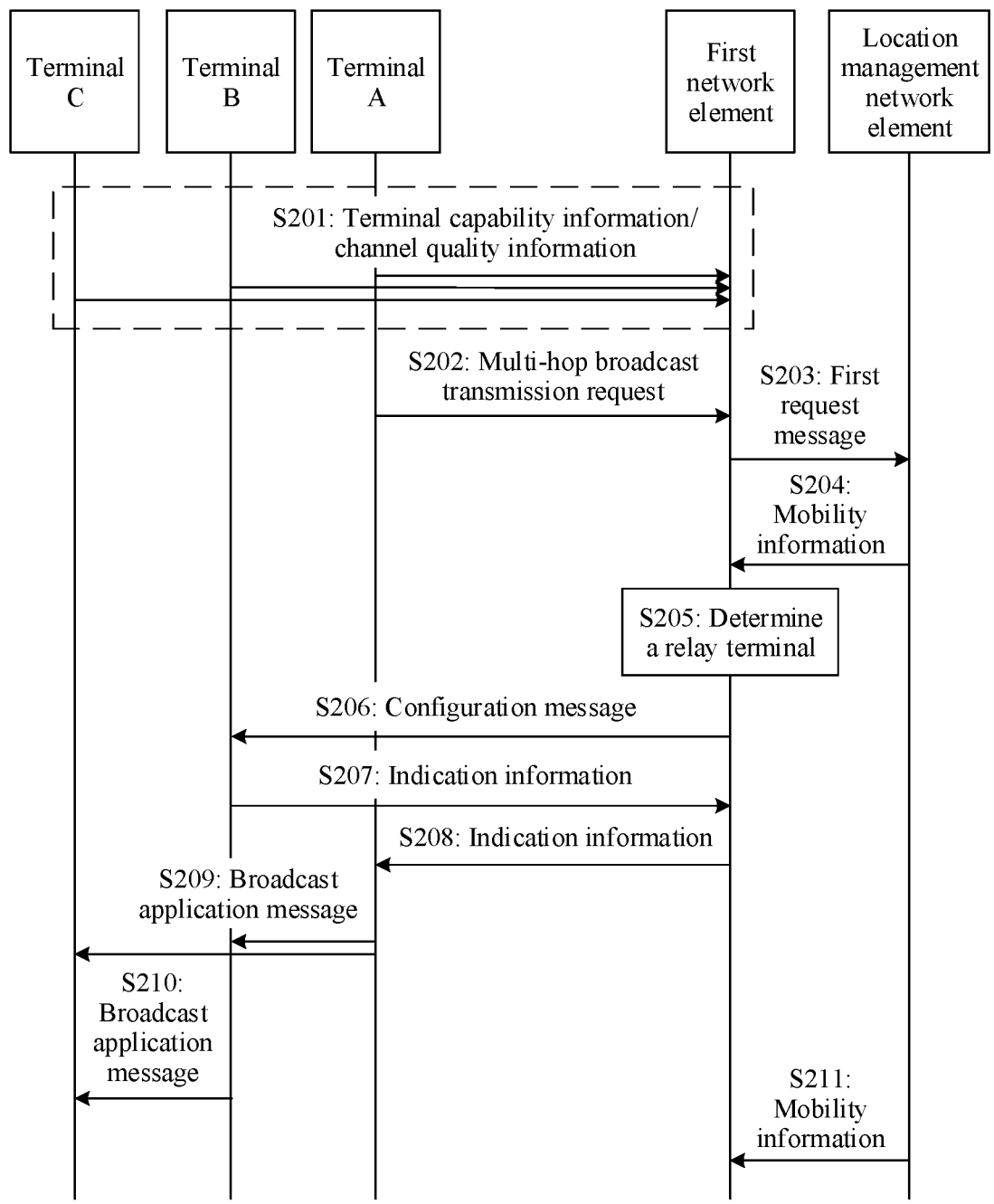
FIG. 6 is a schematic flowchart of another broadcast method according to an embodiment of this application.

Embodiment 2 is a variation of Embodiment 1. An application message of an initiating terminal is forwarded by a relay terminal, and is notified to terminals in a transmission range of the application message in a multi-hop broadcast manner. This is a case similar to that in Embodiment 1. In Embodiment 2, a first network element obtains, from a network element having a location management function, location information of another terminal device that matches the transmission range of the application message. This is a case different from that in Embodiment 1. As shown in FIG. 6, this embodiment includes the following steps.

S201: Terminals send terminal capability information or channel quality information to the first network element.

For details of S201, refer to S101.

S202: A terminal A sends a multi-hop broadcast transmission request to the first network element.

The terminal A is the initiating terminal.

Optionally, the multi-hop broadcast transmission request may include mobility information of the terminal A. Optionally, the multi-hop broadcast transmission request may include a terminal identifier of the terminal A, and is used to obtain the mobility information of the terminal device.

For details of S202, refer to S103.

S203: The first network element sends a first request message to a location management network element, to request to obtain mobility information of the terminal that matches the transmission range of the application message.

A first request includes information used to indicate the transmission range of the application message.

Optionally, the first request includes the terminal identifier of the terminal A, and the terminal identifier is used to obtain the mobility information of the terminal A from the location management network element.

Optionally, the first network element may obtain the mobility information of the terminal A based on the terminal identifier of the terminal A.

Optionally, the location management network element may be a core network element GMLC, or may be a data plane network element SLP. This is not limited in this embodiment of this application.

S204: The location management network element sends, to the first network element, the mobility information of the terminal that matches the transmission range of the application message.

Optionally, the location management network element further sends the mobility information of the terminal A to the first network element.

The first network element may store the received mobility information.

For details of the mobility information, refer to the description of the mobility information in S102.

Optionally, a terminal may report mobility information of the terminal to the location management network element. The terminal may periodically send the mobility information, send the mobility information through an event trigger, or send the mobility information according to an indication of another network element. For example, the terminal may send the mobility information based on a lane change, a movement location change exceeding a specified range, a movement speed change exceeding a specified range, or a change of a movement direction of the terminal device.

Optionally, the location management network element may obtain the mobility information of the terminal by using a positioning function based on a terminal identifier. The obtaining behavior may be performed periodically, through an event trigger, or according to an indication of another network element.

S205: The first network element determines the relay terminal.

For details of S205, refer to S104.

S206: The first network element sends a configuration message to the relay terminal (a terminal B).

For details of S206, refer to S105.

S207: The relay terminal (the terminal B) sends indication information to the first network element.

For details of S207, refer to S106.

S208: The first network element sends indication information to the initiating terminal (the terminal A), where the indication information is used to indicate that the first network element has determined the relay terminal, and the relay terminal has completed configuration.

For details of S208, refer to S107.

S209: The initiating terminal (the terminal A) broadcasts the application message.

For details of S209, refer to S108.

S210: The relay terminal (the terminal B) broadcasts the application message.

For details of S210, refer to S109.

S211: The location management network element updates the mobility information of the terminal in the transmission range of the application message, and sends updated mobility information to the first network element.

Specifically, the first network element determines whether a relay terminal whose mobility information is updated can still cover a vehicle in the transmission range of the application message, and maintains a current multi-hop broadcast manner if the relay terminal can still cover the terminal; or the first network element reselects a relay terminal and performs S205 if the relay terminal cannot cover the terminal.

Optionally, the terminal may report updated terminal capability information or channel quality information. For details, refer to S110.

Optionally, S211 may be performed at any moment. This is not limited in this embodiment of this application.

Through S203, S204, S205, and S206, the first network element may select the relay terminal with reference to the transmission range of the application message and locations of the terminals, and may select the relay terminal that matches the transmission range of the data in multi-hop broadcast. This can satisfy a broadcast coverage requirement, and can also avoid broadcast flooding, and reduce information redundancy, channel contention, or collision interference. An appropriate relay terminal can be more accurately selected by considering the connectivity between the terminals when the relay terminal is to be determined. The appropriate relay terminal can be more accurately selected by introducing a graph concept and algorithm to select the relay terminal. The appropriate relay terminal is accurately selected, so that a relatively small quantity of relay terminals can be used to satisfy the broadcast coverage requirement, and the relay terminal can implement a relay broadcast requirement by using a relatively low transmit power. Therefore, the information redundancy, the channel contention, or the collision interference is further reduced while the broadcast coverage requirement is satisfied.

Embodiment 3

Figure 7:
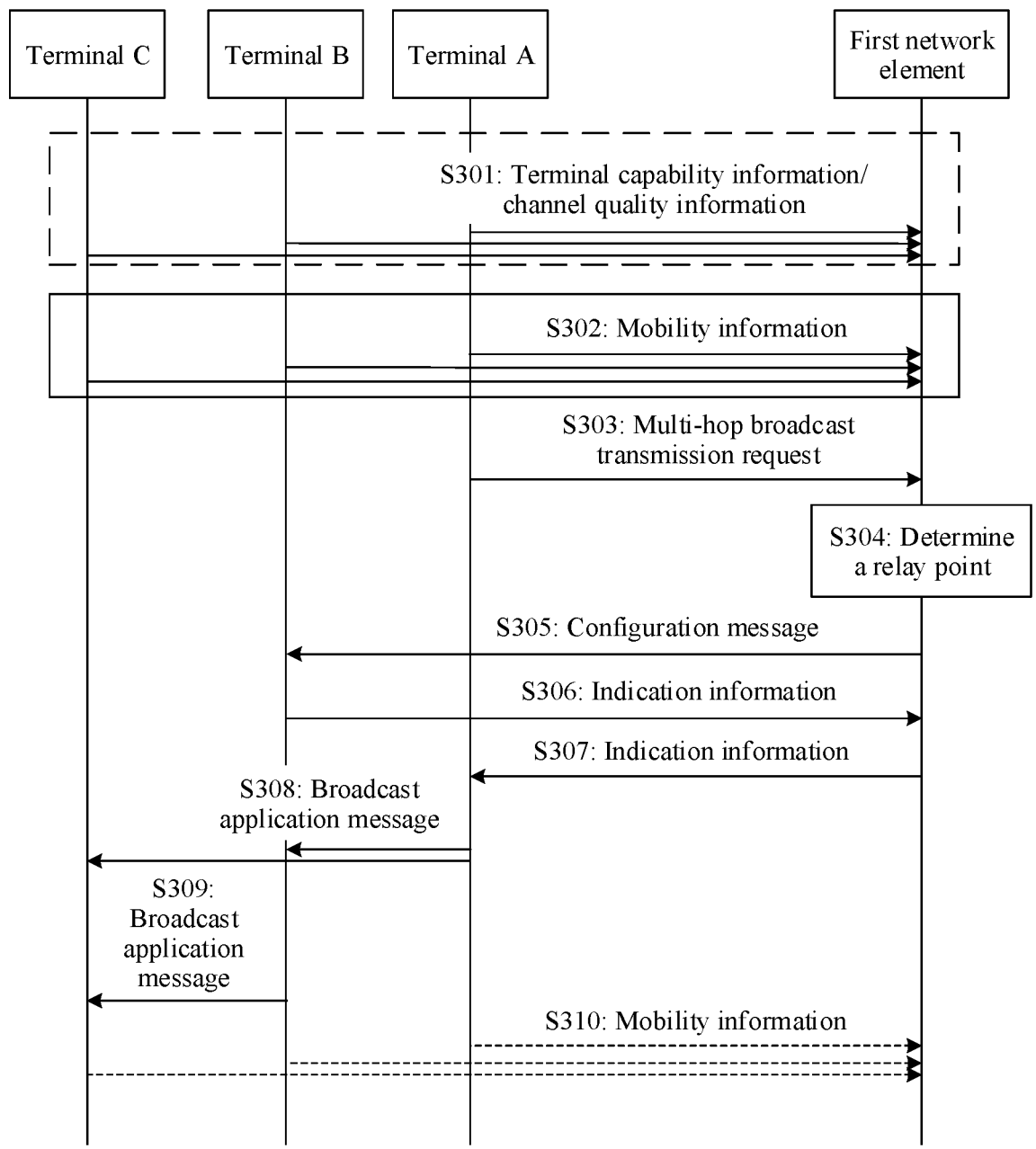
FIG. 7 is a schematic flowchart of still another broadcast method according to an embodiment of this application.

Embodiment 3 is a variation of Embodiment 1 or 2. An application message of an initiating terminal is forwarded by a relay terminal, and is notified to terminals in a transmission range of the application message in a multi-hop broadcast manner. This is a case similar to that in the foregoing embodiment. In Embodiment 3, a multi-hop broadcast request sent by the initiating terminal to a first network element includes an application identifier or the transmission range of the application message, and the first network element generates a first identifier corresponding to the transmission range of the application message. This is a case different from that in the foregoing embodiment. As shown in FIG. 7, this embodiment includes the following steps.

S301: Terminals send terminal capability information or channel quality information to the first network element.

For details of S301, refer to S101.

S302: The terminals send mobility information to the first network element.

For details of S302, refer to S102.

Alternatively, S302 may replace S203 and S204.

S303: The initiating terminal (a terminal A) sends a multi-hop broadcast transmission request to the first network element.

The multi-hop broadcast transmission request includes information used to indicate the transmission range. The information used to indicate the transmission range includes an application identifier, an application type, or the transmission range. For details of related content of S303, refer to S103.

The first network element may learn, based on the information used to indicate the transmission range, of the transmission range of the application message requested to be broadcast.

After receiving the request, the first network element may obtain the first identifier. The first identifier may be a data flow identifier.

In a first implementation, the first network element may generate the first identifier randomly or based on a terminal identifier. After generating the first identifier, the first network element may establish a correspondence between the first identifier and the transmission range, the application identifier, or the application type.

In a second implementation, the first network element may obtain the first identifier based on an existing correspondence between the first identifier and the transmission range, the application identifier, or the application type. The correspondence may be established by the first network element, established by an application server, or preconfigured.

In a third implementation, the first network element may obtain the first identifier from an application server. The application server may generate the corresponding first identifier based on the transmission range, the application identifier, or the application type. To ensure that first identifiers generated by a plurality of application servers are not duplicate in a specific range, different value ranges of the first identifier may be configured for all application servers. The specific range may be a cell covered by a single RAN node, may be a tracking area including a plurality of cells, may be an administrative geographic district level (for example, Haidian District), or may be an administrative geographic municipality level. The range is not limited in this embodiment of this application. The first network element may obtain the first identifier from the application server, and may store a correspondence between the first identifier and the transmission range, the application identifier, or the application type.

Optionally, the first network element may send the correspondence to the terminal.

Based on the correspondence between the first identifier and the transmission range, the application identifier, or the application type, the terminal may reuse the first identifier for broadcast of a same application, broadcast of a same application type, or broadcast of a same transmission range, to avoid that the first network element is repeatedly requested to determine the relay terminal for the broadcast of the same application, the broadcast of the same application type, or the broadcast of the same transmission range.

For other content of S303, refer to S103.

S304: The first network element determines the relay terminal.

For details of S304, refer to S104.

S305: The first network element sends a configuration message to the relay terminal (a terminal B).

For details of S305, refer to S105.

The configuration message includes the first identifier obtained by the first network element in S303.

S306: The relay terminal (the terminal B) sends indication information to the first network element, to indicate that the relay terminal that sends the information has completed configuration based on the foregoing configuration message.

For details of S306, refer to S106.

S307: The first network element sends indication information to the initiating terminal (the terminal A), where the indication information is used to indicate that the first network element has determined the relay terminal, and the relay terminal has completed configuration.

The indication information includes the first identifier obtained by the first network element in S303, and the first identifier needs to be carried in the broadcast application message, so that the relay terminal can perform relay broadcast on the application message by identifying the first identifier after receiving the application message.

S308: The initiating terminal (the terminal A) broadcasts the application message.

The application message includes the first identifier obtained by the terminal A in S307, for example, the data flow identifier.

S309: The relay terminal (the terminal B) broadcasts the application message.

For details of S309, refer to S109.

S310: The terminals update the mobility information, and sends updated mobility information to the first network element.

Optionally, the terminal may further update the terminal capability information or the channel quality information. For details of S310, refer to S110.

In another implementation, S310: A location management network element updates mobility information of a terminal that matches the transmission range of the application message, and sends updated mobility information to the first network element. For details, refer to S211.

Through S302, S304, and S305, the first network element may select the relay terminal with reference to the transmission range of the application message and locations of the terminals, and may select the relay terminal that matches the transmission range of the data in multi-hop broadcast. This can satisfy a broadcast coverage requirement, and can also avoid broadcast flooding, and reduce information redundancy, channel contention, or collision interference. An appropriate relay terminal can be more accurately selected by considering the connectivity between the terminals when the relay terminal is to be determined. The appropriate relay terminal can be more accurately selected by introducing a graph concept and algorithm to select the relay terminal. The appropriate relay terminal is accurately selected, so that a relatively small quantity of relay terminals can be used to satisfy the broadcast coverage requirement, and the relay terminal can implement a relay broadcast requirement by using a relatively low transmit power. Therefore, the information redundancy, the channel contention, or the collision interference is further reduced while the broadcast coverage requirement is satisfied.

Embodiment 4

Figure 8:
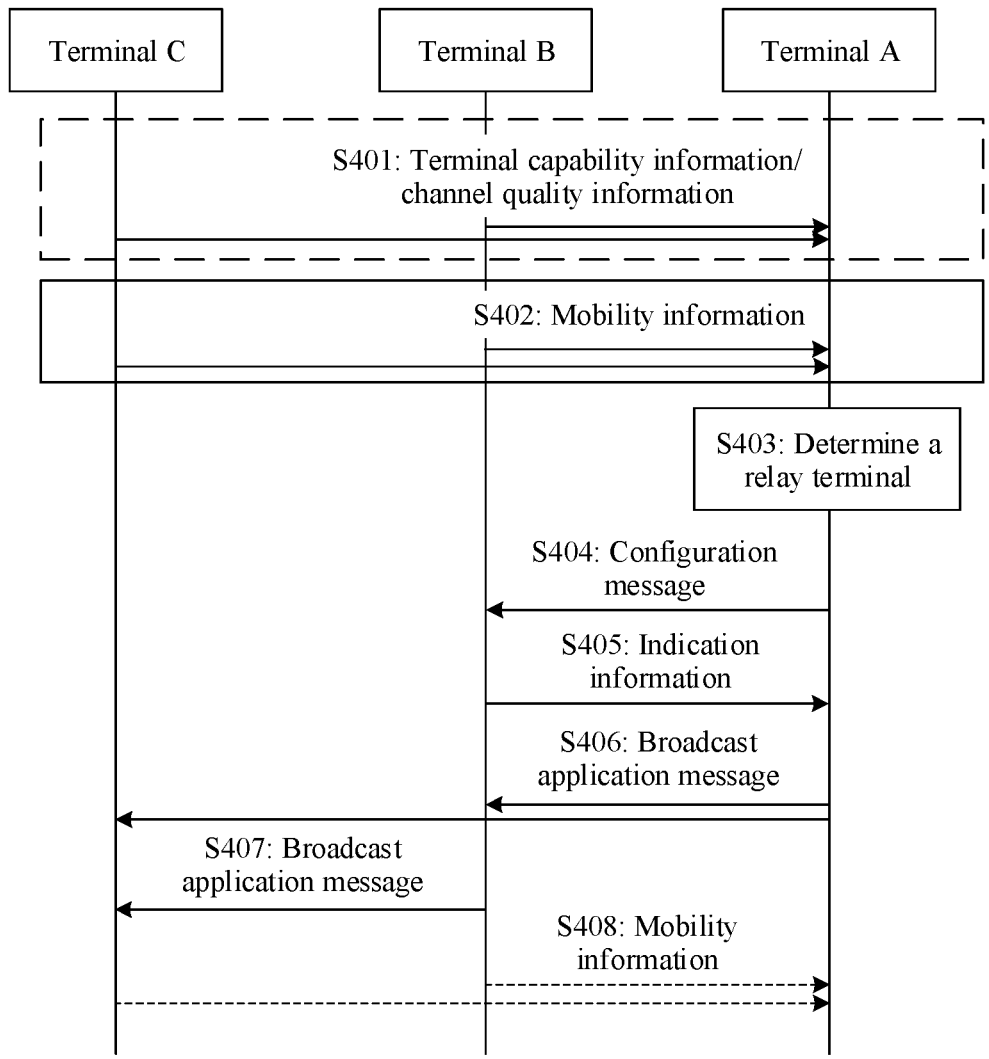
FIG. 8 is a schematic flowchart of yet another broadcast method according to an embodiment of this application.

Embodiment 4 is another variation of Embodiment 1, 2, or 3. An application message of an initiating terminal is forwarded by a relay terminal, and is notified to terminals in a transmission range of the application message in a multi-hop broadcast manner. This is a case similar to that in the foregoing embodiment. In Embodiment 4, the initiating terminal implements functions of the first network element in Embodiment 1, determines the relay terminal, and sends configuration information. This is a case different from that in the foregoing embodiment As shown in FIG. 8, this embodiment includes the following steps.

S401: Terminals send terminal capability information or channel quality information to another terminal (for example, a terminal A).

For related content of S401, refer to related content of S101.

Optionally, the terminals may send the terminal capability information or the channel quality information to the another terminal in a broadcast manner, a multicast manner, or a unicast manner.

Optionally, the terminals may send obtained terminal capability information or channel quality information of other terminals to the another terminal.

S402: The terminals send mobility information to the another terminal (for example, the terminal A).

For related content of S402, refer to related content of S102.

Optionally, the terminals may send the mobility information to the another terminal in the broadcast manner, the multicast manner, or the unicast manner.

Optionally, the terminals may send obtained mobility information of other terminals to the another terminal.

In another implementation, S402 may alternatively be that the initiating terminal obtains mobility information of another terminal device from a location management network element. A related manner is similar to S203 and S204. Details are not described herein again.

S403: The initiating terminal (the terminal A) determines the relay terminal.

For details of S403, refer to S104.

For related content of a first identifier, an application identifier, an application type, a transmission range, and the like, refer to related content in Embodiments 1, 2, and 3.

S404: The initiating terminal (the terminal A) sends a configuration message to the relay terminal.

For S404, refer to related content in S105, S206, and S305.

For a process of generating or obtaining a data flow identifier, refer to, for example, related content in S103.

Optionally, the initiation terminal may send a configuration message to relay terminals in a broadcast manner, and the configuration message further include identifiers of the relay terminals, so that the terminal devices corresponding to information about the identifiers learn that the terminal devices need to broadcast and forward an application message carrying the data flow identifier.

Optionally, the initiating terminal may send configuration messages to relay terminals in a multicast group in a multicast manner, and the configuration messages include identifiers of the relay terminals.

Optionally, the initiating terminal may send the configuration message to the relay terminal in a unicast manner, and the configuration message may not include an identifier of the relay terminal.

S405: The relay terminal (the terminal B) sends indication information to the initiating terminal (the terminal A), to indicate that the relay terminal that sends the indication information has completed configuration based on the foregoing configuration message.

For details of S405, refer to S106.

S406: The initiating terminal (the terminal A) broadcasts the application message.

For details of S406, refer to S108.

S407: The relay terminal broadcasts the application message.

For details of S407, refer to S109.

S408: The terminals update the mobility information, and sends updated mobility information to the initiating terminal (the terminal A).

For details of S408, refer to S110.

In another implementation, S408 may be that the location management network element updates the mobility information, and sends updated mobility information to the initiating terminal (the terminal A). For details, refer to S211.

A person skilled in the art may know that, according to Embodiment 4, in addition to the initiating terminal, another terminal may also serve as a broadcast decision node. This may be implemented through variation based on Embodiment 4. Details are not described in this application.

Through S402, S403, and S404, the initiating terminal may select the relay terminal with reference to the transmission range of the application message and locations of the terminals, and may select the relay terminal that matches the transmission range of the data in multi-hop broadcast. This can satisfy a broadcast coverage requirement, and can also avoid broadcast flooding, and reduce information redundancy, channel contention, or collision interference. An appropriate relay terminal can be more accurately selected by considering the connectivity between the terminals when the relay terminal is to be determined. The appropriate relay terminal can be more accurately selected by introducing a graph concept and algorithm to select the relay terminal. The appropriate relay terminal is accurately selected, so that a relatively small quantity of relay terminals can be used to satisfy the broadcast coverage requirement, and the relay terminal can implement a relay broadcast requirement by using a relatively low transmit power. Therefore, the information redundancy, the channel contention, or the collision interference is further reduced while the broadcast coverage requirement is satisfied.

In the foregoing implementation, the first network element in Embodiments 1 to 3 and the start terminal in Embodiment 4 play a role of determining the relay terminal, and may be referred to as broadcast decision apparatuses. In this application, the broadcast decision apparatus may be an independent network element, or may be a system including a plurality of network elements.

In this application, connectivity between terminals refers to whether there is a possibility of communication between the terminals. The connectivity may be affected by locations of the terminals, a distance between the terminals, communication coverage capabilities of the terminals, and channel quality between the terminals. In this application, determining connectivity between some terminals in a plurality of terminals may also be understood as determining connectivity between the plurality of terminals. In this application, an end node of a path corresponding to a graph is not necessarily selected as a relay terminal, and a leaf node of a spanning tree corresponding to the graph is not necessarily selected as the relay terminal. In this application, it is not required that all intermediate nodes of the path corresponding to the graph are used as relay terminals, and it is not required that all intermediate nodes of the spanning tree corresponding to the graph are used as the relay terminals. In this application, broadcast decision information may be presented in a plurality of manners. For example, one piece of broadcast decision information may correspond to terminals. For another example, one piece of broadcast decision information may correspond to one terminal. In this application, the broadcast coverage requirement refers to an expected transmission range of data. In this application, a transmission range of the data refers to a physical space range of data transmission, such as one kilometre around an accident vehicle. In this application, the data may be service data, a message, signaling, or the like.

Embodiment 5

Figure 9:
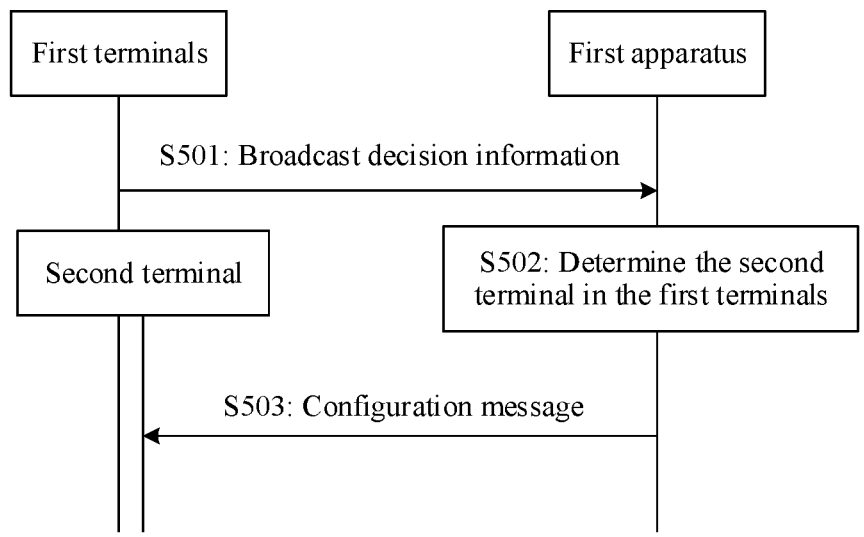
FIG. 9 is a schematic flowchart of yet another broadcast method according to an embodiment of this application.

Embodiment 5 describes, from a perspective of a broadcast decision apparatus based on Embodiments 1 to 4, a broadcast method provided in an embodiment of this application. As shown in FIG. 9, the method includes the following steps.

S501: A first apparatus obtains broadcast decision information of a plurality of first terminals.

The first apparatus is a broadcast decision apparatus.

The broadcast decision information includes mobility information, and the mobility information is used to indicate locations of the first terminals.

For obtaining of the broadcast decision information, refer to related content in S101, S102, S201, S203, S204, S301, S302, S401, and S402.

S502: The first apparatus determines a second terminal in the plurality of first terminals based on the broadcast decision information and a first range.

The first range is a transmission range of first data, and the second terminal is a determined relay terminal.

S502: For details, refer to S104, S205, S304, and S403.

S503: The first apparatus sends configuration information to the second terminal.

The configuration information is used to indicate the second terminal to broadcast the first data. The second terminal may be referred to as the relay terminal.

For details, refer to S105, S206, S305, and S404.

Optionally, the first apparatus may be a terminal, a core network element, or a base station. Alternatively, the first apparatus may be an independent network element deployed in an access network or a core network. Alternatively, the first apparatus may be a system apparatus including a plurality of network elements, and the plurality of network elements may respectively implement parts of S501, S502, and S503 in the foregoing method.

Optionally, the first apparatus may obtain the broadcast decision information from different sources. For example, the first apparatus may obtain the broadcast decision information from a network element that stores the broadcast decision information. For another example, the broadcast decision information may be distributed and stored on different network elements, and the first apparatus may obtain the broadcast decision information from the different network elements. For still another example, a terminal may report the broadcast decision information, and the first apparatus may receive the broadcast decision information from the terminal.

Optionally, S502 includes: determining, by the first apparatus, a plurality of third terminals and connectivity between the plurality of third terminals in the plurality of first terminals based on the broadcast decision information and the first range, where the connectivity is related to locations of the plurality of third terminals; and selecting, by the first apparatus, some third terminals from the plurality of third terminals as second terminals based on the connectivity. An appropriate relay terminal can be more accurately selected by considering the connectivity between the terminals when the relay terminal is to be determined.

Optionally, S502 includes: determining, by the first apparatus in the plurality of first terminals based on the broadcast decision information and the first range, a graph that includes a plurality of third terminals, where a plurality of vertexes of the graph represent the plurality of third terminals, a plurality of edges of the graph represent connectivity between the plurality of third terminals, and the connectivity is related to locations of the plurality of third terminals; and determining, by the first apparatus, the second terminal in the graph according to a graph algorithm. Optionally, weights of the plurality of edges represent overheads of the connectivity, and the overheads are related to the locations of the plurality of third terminals. Optionally, the graph algorithm may be a shortest path algorithm. Optionally, the second terminal is an intermediate node of a path corresponding to the graph. Optionally, the graph algorithm may be a spanning tree algorithm. Optionally, the second terminal is an intermediate node of a spanning tree corresponding to the graph. Optionally, the shortest path algorithm may include a Dijkstra's algorithm or a Floyd-Warshall algorithm. Optionally, the spanning tree algorithm may include a breadth-first spanning tree algorithm or a minimum spanning tree algorithm. Optionally, the minimum spanning tree algorithm may include a Prim's algorithm or a Kruskal's algorithm. The appropriate relay terminal can be more accurately selected by introducing a graph concept and algorithm to select the relay terminal.

Optionally, the broadcast decision information further includes terminal capability information, where the terminal capability information is used to indicate communication coverage of the first terminals. Optionally, the terminal capability information includes the communication coverage of the first terminals or transmit powers of the first terminals. Optionally, the terminal capability information may be used to determine connectivity between the terminals or overheads of the connectivity. Accuracy of determining the connectivity between the terminals or the overheads of the connectivity can be improved by considering the communication coverage of the terminals. For details, refer to descriptions of the terminal capability information in S101, S201, S301, and S401.

Optionally, the broadcast decision information further includes channel quality information, where the channel quality information is used to indicate channel quality between the plurality of first terminals. Optionally, the channel quality information may be used to determine the connectivity between the terminals or the overheads of the connectivity. Accuracy of determining the connectivity between the terminals or the overheads of the connectivity can be improved by considering channel quality between the terminals. For details, refer to descriptions of the channel quality information in S101, S201, S301, and S401.

Optionally, the mobility information further includes movement directions or movement speeds of the first terminals. The locations of the terminals during broadcast may be determined by using the movement directions or the movement speeds. Accuracy of determining the connectivity between the terminals or the overheads of the connectivity can be improved by considering the movement directions or the movement speeds. For details, refer to descriptions of the mobility information in S102, S204, S302, and S402.

Optionally, in S503, the configuration information includes a first identifier, and the first identifier is used to identify to-be-broadcast data; and the first data carries the first identifier. Optionally, the first identifier may be a data flow identifier of the data. Because different application messages may have a same broadcast coverage requirement, the determined relay terminal may be reused for the different application messages by using the identifier, to avoid repeatedly determining the relay terminal for the different application messages having the same broadcast coverage requirement. Optionally, that the first data carries the first identifier includes: The first data includes the first identifier, or the first data is scrambled by using the first identifier.

Optionally, the first apparatus obtains the first identifier from a broadcast initiating terminal. Optionally, the first apparatus allocates the first identifier or obtains the first identifier from a broadcast control network element; and the first apparatus sends the first identifier to a broadcast initiating terminal. For a process in which the first apparatus obtains the first identifier, refer to the process of generating or obtaining the data flow identifier in S103, S202, S303, and S404.

Optionally, the first apparatus obtains, from the broadcast initiating terminal, information used to indicate the first range. Optionally, the information used to indicate the first range includes an application identifier, a data type, or data importance. The first range may be obtained by using a correspondence between the application identifier, the data type, or the data importance and the transmission range. Optionally, the information used to indicate the first range may be the first range. For details, refer to the process of obtaining the transmission range of the application message in S103, S202, and S303.

Optionally, the first apparatus receives a first request from the broadcast initiating terminal, where the first request is used to request to broadcast the first data. Optionally, the first request may include the first identifier or the information used to indicate the first range. For details, refer to the process in which the first terminal sends the multi-hop broadcast transmission request in S103, S202, and S303.

Optionally, the broadcast initiating terminal has permission to request to broadcast the first data. The first apparatus may authenticate the broadcast initiating terminal to determine whether the broadcast initiating terminal has the permission to request to broadcast the first data.

Optionally, the second terminal has permission to broadcast the first data. The first apparatus may authenticate the second terminal to determine whether the second terminal has the permission to broadcast the first data.

Optionally, the first apparatus obtains updated broadcast decision information; the first apparatus determines, based on the updated broadcast decision information, whether to update the second terminal; and determines a new second terminal based on the updated broadcast decision information and the first range if the first apparatus determines to update the second terminal. For details, refer to S110, S211, S310, and S408.

Through S501, S502, and S503, the first apparatus collects location information of terminals, and selects the relay terminal with reference to a transmission range of data and locations of the terminals, and may select a relay terminal that matches the transmission range of the data in multi-hop broadcast. This can satisfy a broadcast coverage requirement, and can also avoid broadcast flooding, and reduce information redundancy, channel contention, or collision interference.

Embodiment 6

Figure 10:
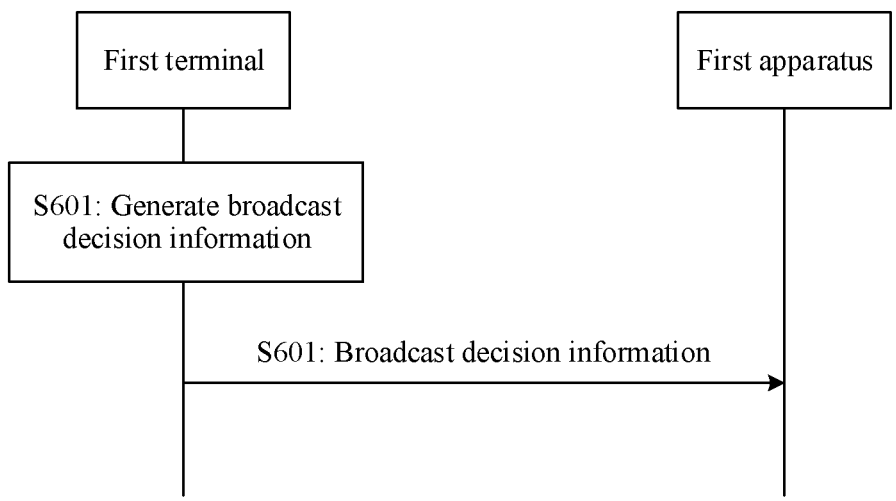
FIG. 10 is a schematic flowchart of yet another broadcast method according to an embodiment of this application.

Embodiment 6 describes, from a perspective of a terminal based on Embodiments 1 to 4, a broadcast method provided in an embodiment of this application. A first terminal in FIG. 10 may be the terminal C or the terminal B selected as the relay terminal in the foregoing embodiment. As shown in FIG. 10, the method includes the following steps.

S601: The first terminal generates broadcast decision information.

The broadcast decision information is used to determine whether the first terminal broadcasts data having a specific transmission range, the broadcast decision information includes mobility information, and the mobility information is used to indicate a location of the first terminal.

S602: The first terminal sends the broadcast decision information to a first apparatus.

For details of S601 and S602, refer to related content in S101, S102, S201, S203, S204, S301, S302, S401, and S402 in the foregoing embodiments. Optionally, the first terminal receives configuration information from a second apparatus, where the configuration information is used to indicate the first terminal to broadcast first data whose transmission range is a first range. Optionally, the second apparatus and the first apparatus may be a same device. The first apparatus may be the apparatus for receiving the broadcast decision information in the foregoing embodiment, and the second apparatus may be the apparatus for sending the configuration information in the foregoing embodiment.

Optionally, the configuration information includes a first identifier, and the first identifier is used to identify to-be-broadcast data; and the first data carries the first identifier. Because different application messages may have a same broadcast coverage requirement, the determined relay terminal may be reused for the different application messages by using the identifier, to avoid repeatedly determining the relay terminal for the different application messages having the same broadcast coverage requirement. For details, refer to the description about the first identifier in the foregoing embodiment.

Optionally, the broadcast decision information further includes terminal capability information, where the terminal capability information is used to indicate communication coverage of the first terminal. For details, refer to descriptions of the terminal capability information in S101, S201, S301, and S401.

Optionally, the broadcast decision information further includes channel quality information, where the channel quality information is used to indicate channel quality between the first terminal and another terminal. For details, refer to descriptions of the channel quality information in S101, S201, S301, and S401.

Optionally, the mobility information further includes a movement direction or a movement speed of the first terminal. For details, refer to descriptions of the mobility information in S102, S204, S302, and S402.

Through S601 and S602, whether a terminal is used as a relay terminal to broadcast data may be determined with reference to a transmission range of the data and a location of the terminal by reporting the location of the terminal by the terminal. This facilitates selection of a relay terminal that matches the transmission range of the data in multi-hop broadcast. This can satisfy a broadcast coverage requirement, and can also avoid broadcast flooding, and reduce information redundancy, channel contention, or collision interference.

Embodiment 7

Figure 11:
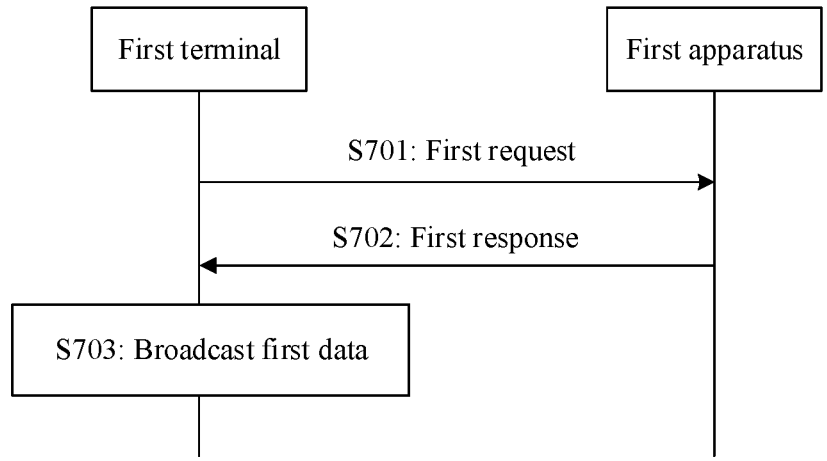
FIG. 11 is a schematic flowchart of yet another broadcast method according to an embodiment of this application.

Embodiment 7 describes, from a perspective of an initiating terminal based on Embodiments 1 to 4, a broadcast method provided in an embodiment of this application. A first terminal in FIG. 11 may be the initiation terminal in the foregoing embodiment. As shown in FIG. 11, the method includes the following steps.

S701: The first terminal sends a first request to a first apparatus.

The first request is used to request to broadcast first data whose transmission range is a first range.

S702: The first terminal receives, from the first apparatus, a first response in response to the first request.

The first response is used to indicate to broadcast the first data.

S703: The first terminal broadcasts the first data.

For related descriptions of S701 to S703, refer to related content of S103, S107, S108, S202, S208, S209, S303, S307, and S308. For related content of the transmission range, refer to content in the foregoing embodiment.

Optionally, the first request includes a first identifier, and the first identifier is used to identify to-be-broadcast data; and the first data carries the first identifier. Optionally, the first response includes a first identifier, and the first identifier is used to identify to-be-broadcast data; and the first data carries the first identifier. For related content of the first identifier, refer to related content in the foregoing embodiment. Details are not described herein again.

Optionally, the first request includes information used to indicate the first range. For related content of the information used to indicate the first range, refer to related content of the information used to indicate the transmission range in the foregoing embodiment.

Embodiment 8

Figure 12:
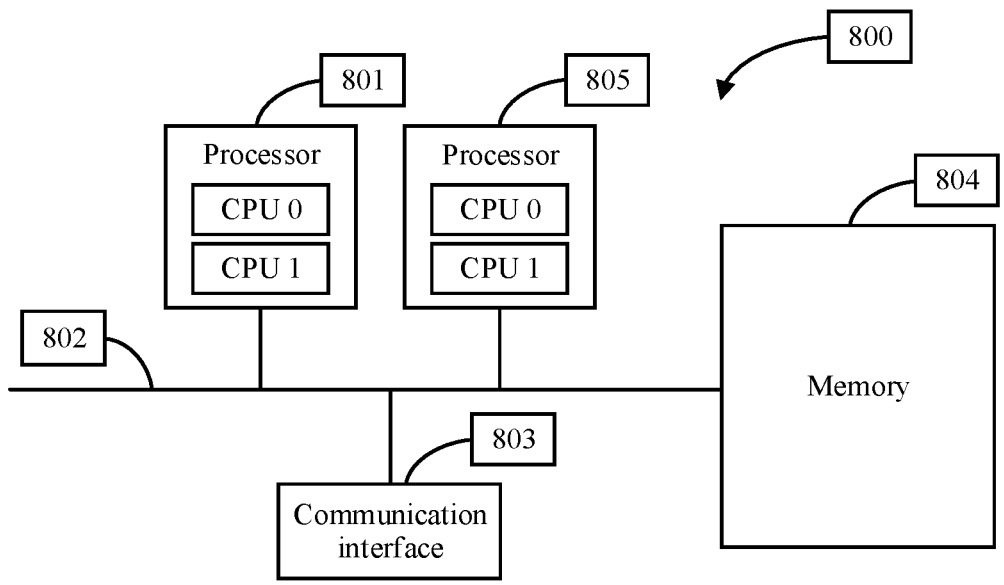
FIG. 12 is a schematic diagram of a structure of a communication apparatus according to an embodiment of this application.

This embodiment provides a communication apparatus that may be configured to implement, for example, a function of the first network element in Embodiment 1, a function of the first network element in Embodiment 2, a function of the first network element in Embodiment 3, or a function of the first apparatus in Embodiment 5. The communication apparatus may be deployed on a core network side. FIG. 12 is a schematic diagram of a structure of a communication apparatus 800 according to an embodiment of this application. The communication apparatus 800 includes one or more processors 801, a communication line 802, and at least one communication interface (in FIG. 12, only an example in which a communication interface 803 and one processor 801 are included is used for description). Optionally, the communication device 800 may further include a memory 804.

The processor 801 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 802 is used to connect different components.

The communication interface 803 may be a transceiver module, and is configured to communicate with another device, a communication apparatus, or a communication network, such as the Ethernet. For example, the transceiver module may be a network adapter or a fiber switch apparatus. Optionally, the communication interface 803 may alternatively be a transceiver circuit located in the processor 801, and is configured to implement signal input and signal output of the processor.

The memory 804 may be an apparatus having a storage function. For example, the memory 804 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM), another optical disk storage, an optical disc storage (including a compact disc, a laser disc, an optical disc, a digital versatile disc, a Blu-ray disc, or the like), a disk storage medium, another magnetic storage device, or any other medium that can be used to carry or store expected program code in a form of instructions or a data structure and that can be accessed by a computer. However, this is not limited thereto. The memory may exist independently, and is connected to the processor by using the communication line 802. Alternatively, the memory may be integrated with the processor.

The memory 804 is configured to store computer-executable instructions for executing the solutions in this application, and the execution is controlled by the processor 801. The processor 801 is configured to execute the computer-executable instructions stored in the memory 804, to implement the function of the first network element in Embodiment 1, the function of the first network element in Embodiment 2, the function of the first network element in Embodiment 3, or the function of the first apparatus in Embodiment 5 of this application. The computer-executable instructions in this embodiment of this application may also be referred to as application program code. This is not specifically limited in this embodiment of this application.

During specific implementation, in an embodiment, the processor 801 may include one or more CPUs such as a CPU 0 and a CPU 1 shown in FIG. 12.

During specific implementation, in an embodiment, the communication apparatus 800 may include a plurality of processors such as the processor 801 and a processor 805 in FIG. 12. Each of the processors may be a single-core (single-CPU) processor or a multi-core (multi-CPU) processor. The processor herein may refer to one or more devices, circuits, and/or processing cores configured to process data (for example, computer program instructions).

The communication apparatus 600 may be a general-purpose apparatus or a dedicated apparatus. For example, the communication apparatus 600 may be a network server, an embedded device, or a device having a structure similar to that shown in FIG. 12. A type of the communication apparatus 800 is not limited in this embodiment of this application.

It may be understood that, in the foregoing embodiments, the methods and/or the steps implemented by the first network element or the first apparatus may alternatively be implemented by a chip system that implements the function of the first network element or the first apparatus.

Embodiment 9

Figure 13:
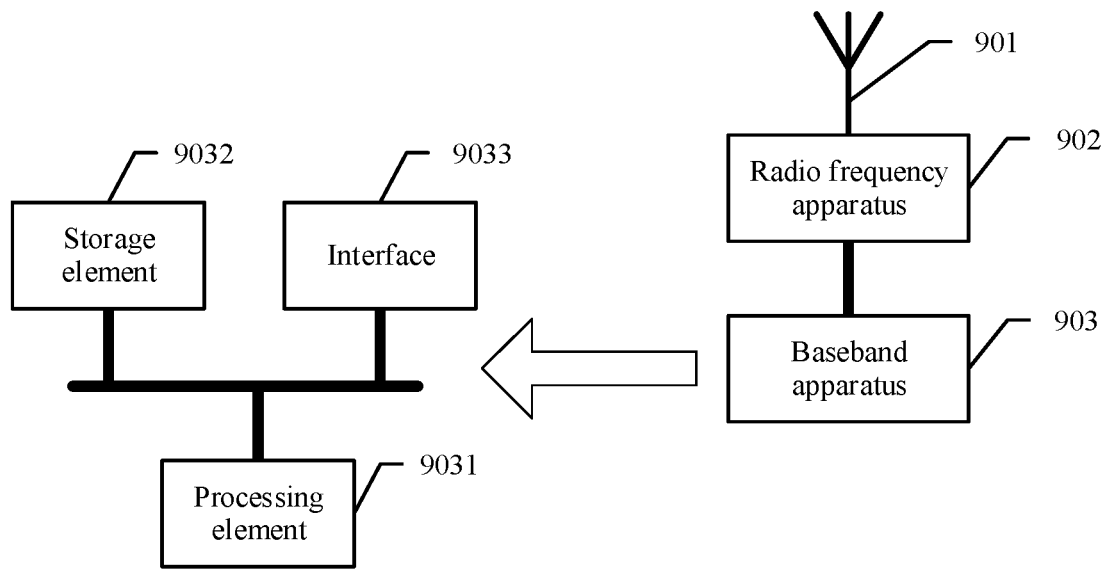
FIG. 13 is a schematic diagram of a structure of another communication apparatus according to an embodiment of this application.

This embodiment provides a communication apparatus that may be configured to implement, for example, a function of the first network element in Embodiment 1, a function of the first network element in Embodiment 2, a function of the first network element in Embodiment 3, or a function of the first apparatus in Embodiment 5. The communication apparatus may be deployed on an access network side. FIG. 13 is a schematic diagram of a structure of a communication apparatus 900 according to an embodiment of this application. The communication apparatus 900 includes an antenna 901, a radio frequency apparatus 902, and a baseband apparatus 903. The antenna 901 is connected to the radio frequency apparatus 902. In an uplink direction, the radio frequency apparatus 902 receives, by using the antenna 901, information sent by a terminal, and sends, to the baseband apparatus 903 for processing, information sent by user equipment. In a downlink direction, the baseband apparatus 903 processes information about the terminal, and sends the information to the radio frequency apparatus 902. The radio frequency apparatus 902 processes the information about the user equipment, and then sends the processed information to the terminal by using the antenna 901.

The baseband apparatus 903 may include one or more processing elements 9031, for example, include one main control CPU and another integrated circuit. In addition, the baseband apparatus 903 may further include a storage element 9032 and an interface 9033. The storage element 9032 is configured to store computer-executable instructions for executing the solutions of this application, and the processing element 9031 controls the execution. The interface 9033 is configured to exchange information with the radio frequency apparatus 902, and the interface is, for example, a common public radio interface (common public radio interface, CPRI). The processing element 9031 is configured to execute the computer-executable instructions stored in the storage element 9032, to implement the function of the first network element in Embodiment 1, the function of the first network element in Embodiment 2, the function of the first network element in Embodiment 3, or the function of the first apparatus in Embodiment 5 of this application. The computer-executable instructions in this embodiment of this application may also be referred to as application program code. This is not specifically limited in this embodiment of this application. In the foregoing embodiments, the methods and/or the steps implemented by the first network element or the first apparatus may alternatively be implemented by a chip on the baseband apparatus 903, where the chip includes at least one processing element and an interface circuit. The processing element is configured to perform steps of any method performed by the first network element or the first apparatus, and the interface circuit is configured to communicate with another apparatus.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

The communication apparatus 900 may be a general-purpose apparatus or a dedicated apparatus. For example, the communication apparatus 900 may be a network server, a base station, or a device having a structure similar to that in FIG. 12. A type of the communication apparatus 900 is not limited in this embodiment of this application.

It may be understood that, in the foregoing embodiments, the methods and/or the steps implemented by the first network element or the first apparatus may alternatively be implemented by a chip system that implements the function of the first network element or the first apparatus.

Embodiment 10

Figure 14:
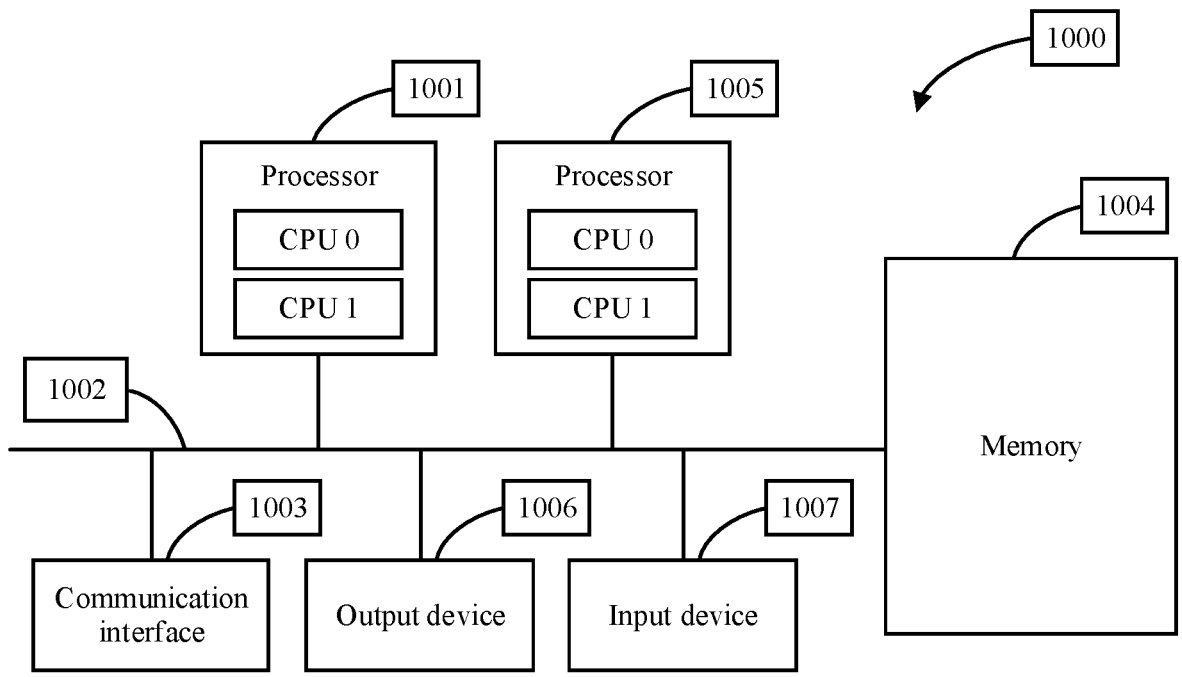
FIG. 14 is a schematic diagram of a structure of still another communication apparatus according to an embodiment of this application.

This embodiment provides a communication apparatus that may be configured to implement, for example, a function of the initiating terminal in Embodiment 4 or a function of the first apparatus in Embodiment 5. FIG. 14 is a schematic diagram of a structure of a communication apparatus 1000 according to an embodiment of this application. The communication apparatus 1000 includes one or more processors 1001, a communication line 1002, and at least one communication interface (in FIG. 14, only an example in which a communication interface 1003 and one processor 1001 are included is used for description). Optionally, the communication device 1000 may further include a memory 1004.

The processor 1001 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 1002 is used to connect different components.

The communication interface 1003 may be a transceiver module, and is configured to communicate with another device, a communication apparatus, or a communication network, for example, the Ethernet, a RAN, or a wireless local area network (wireless local area networks, WLAN). For example, the transceiver module may be an apparatus such as a transceiver, or may be a network adapter or a fiber switch apparatus. Optionally, the communication interface 1003 may alternatively be a transceiver circuit located in the processor 1001, and is configured to implement signal input and signal output of the processor.

The memory 1004 may be an apparatus having a storage function. For example, the memory 1004 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM), another optical disk storage, an optical disc storage (including a compact disc, a laser disc, an optical disc, a digital versatile disc, a Blu-ray disc, or the like), a disk storage medium, another magnetic storage device, or any other medium that can be used to carry or store expected program code in a form of instructions or a data structure and that can be accessed by a computer. However, this is not limited thereto. The memory may exist independently, and is connected to the processor by using the communication line 1002. Alternatively, the memory may be integrated with the processor.

The memory 1004 is configured to store computer-executable instructions for executing the solutions in this application, and the execution is controlled by the processor 1001. The processor 1001 is configured to execute the computer-executable instructions stored in the memory 1004, to implement the function of the first terminal device in Embodiment 4 or the function of the first apparatus in Embodiment 5 of this application. The computer-executable instructions in this embodiment of this application may also be referred to as application program code. This is not specifically limited in this embodiment of this application.

During specific implementation, in an embodiment, the communication apparatus 1000 may further include an output device 106 and an input device 1007. The output device 1006 communicates with the processor 1001, and may display information in a plurality of manners.

During specific implementation, in an embodiment, the processor 1001 may include one or more CPUs such as a CPU 0 and a CPU 1 shown in FIG. 14.

During specific implementation, in an embodiment, the communication apparatus 1000 may include a plurality of processors such as the processor 1001 and a processor 1005 in FIG. 14. Each of the processors may be a single-core (single-CPU) processor or a multi-core (multi-CPU) processor. The processor herein may refer to one or more devices, circuits, and/or processing cores configured to process data (for example, computer program instructions).

The communication apparatus 1000 may be a general-purpose apparatus or a dedicated apparatus. For example, the communication apparatus 1000 may be a network server, an embedded device, a desktop computer, a portable computer, a mobile phone, a tablet computer, a wireless terminal device, or a device having a structure similar to that in FIG. 14. A type of the communication apparatus 1000 is not limited in this embodiment of this application.

It may be understood that, in the foregoing embodiments, the methods and/or the steps implemented by the first terminal or the first apparatus may alternatively be implemented by a chip system that implements the function of the first terminal or the first apparatus.

Embodiment 11

This embodiment provides a communication apparatus that may be configured to implement, for example, functions of the relay terminal in Embodiment 1 to Embodiment 4 and the first terminal in Embodiment 6. For a diagram of a structure of the communication apparatus, refer to FIG. 14.

A memory is configured to store computer-executable instructions for executing the solutions in this application, and the execution is controlled by a processor. The processor is configured to execute the computer-executable instructions stored in the memory, to implement a function of the relay terminal in Embodiment 1 to Embodiment 4 or the first terminal in Embodiment 6 of this application. The computer-executable instructions in this embodiment of this application may also be referred to as application program code. This is not specifically limited in this embodiment of this application.

It may be understood that, in the foregoing embodiments, the methods and/or the steps implemented by a function of the relay terminal in Embodiment 1 to Embodiment 4 or the first terminal in Embodiment 6 may alternatively be implemented by a chip system that implements the function of the relay terminal in Embodiment 1 to Embodiment 4 or the first terminal in Embodiment 6.

Embodiment 12

This embodiment provides a communication apparatus that may be configured to implement, for example, a function of the initiating terminal in Embodiment 1 to Embodiment 4 or the first terminal in Embodiment 7. For a schematic diagram of a structure of a communication apparatus provided in this embodiment of this application, refer to FIG. 14.

A memory is configured to store computer-executable instructions for executing the solutions in this application, and the execution is controlled by a processor. The processor is configured to execute the computer-executable instructions stored in the memory, to implement a function of the initiating terminal in Embodiment 1 to Embodiment 4 or the first terminal in Embodiment 7 of this application. The computer-executable instructions in this embodiment of this application may also be referred to as application program code. This is not specifically limited in this embodiment of this application.

It may be understood that, in the foregoing embodiments, the method and/or the steps implemented by a function of the initiating terminal in Embodiment 1 to Embodiment 4 or the first terminal in Embodiment 7 may alternatively be implemented by a chip system that implements the function of the initiating terminal in Embodiment 1 to Embodiment 4 or the first terminal in Embodiment 7.

Embodiment 13

This embodiment provides a communication apparatus that may be configured to implement, for example, a function of the first network element in Embodiment 1, a function of the first network element in Embodiment 2, a function of the first network element in Embodiment 3, a function of the initiating terminal in Embodiment 4, or a function of the first apparatus in Embodiment 5. In this embodiment of this application, the communication apparatus may be divided into functional units based on the foregoing method embodiment. For example, each functional unit may be obtained through division based on each corresponding function, or two or more units may be integrated into one processing module. The integrated unit may be implemented in a form of hardware, or may be implemented in a form of a software functional module. It should be noted that, in the embodiments of this application, division into the units is an example, and is merely logical function division. During actual implementation, another division manner may be used.

Figure 15:
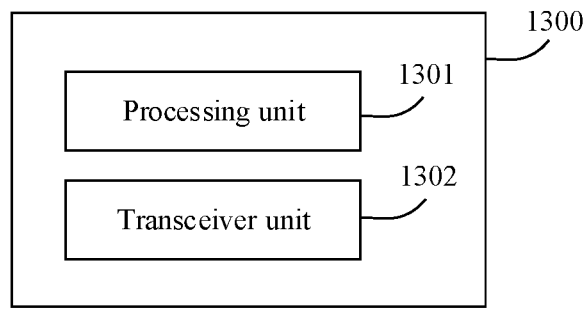
FIG. 15 is a schematic diagram of a structure of still another communication apparatus according to an embodiment of this application.

FIG. 15 is a schematic diagram of a structure of a communication apparatus 1300 according to an embodiment of this application. The communication apparatus 1300 includes a processing unit 1301 and a transceiver unit 1302.

Optionally, the processing unit 1301 is specifically used for a function of selecting the relay terminal in S104, S205, S304, S403, and S502.

Optionally, the transceiver unit 1302 is specifically used for a function of receiving the terminal capability information or the channel quality information in S101, S201, S301, S401, and S501.

Optionally, the transceiver unit 1302 is specifically used for a function of receiving the mobility information in S102, S204, S302, S402, and S501.

Optionally, the transceiver unit 1302 is specifically used for a function of receiving the multi-hop broadcast transmission request in S103, S202, and S303.

Optionally, the transceiver unit 1302 is specifically used for a function of sending the first request message in S203.

Optionally, the transceiver unit 1302 is specifically used for a function of sending the configuration message in S105, S206, S305, S404, and S503.

Optionally, the transceiver unit 1302 is specifically used for a function of receiving the indication information in S106, S207, S306, and S405.

Optionally, the transceiver unit 1302 is specifically used for a function of sending the indication information in S107, S208, and S307.

Specifically, the processor 801 in the communication device 800 shown in FIG. 12 may invoke the computer-executable instructions stored in the memory 804, to implement functions/implementation processes of the transceiver unit 1302 and the processing unit 1301 in FIG. 15. Alternatively, the processor 801 in the communication device 800 shown in FIG. 12 may invoke the computer-executable instructions stored in the memory 804, to implement functions/implementation processes of the processing unit 1301 in FIG. 15, and the communication interface 803 in the communication device 800 shown in FIG. 12 may implement functions/implementation processes of the transceiver unit 1302 in FIG. 15. Alternatively, the processing element 9031 in the communication device 900 shown in FIG. 13 may invoke the computer-executable instructions stored in the storage element 9032, to implement functions/implementation processes of the transceiver unit 1302 and the processing unit 1301 in FIG. 15. Alternatively, the processing element 9031 in the communication device 900 shown in FIG. 13 may invoke the computer-executable instructions stored in the storage element 9032, to implement functions/implementation processes of the processing unit 1301 in FIG. 15, and the interface 9033, the radio frequency apparatus 902, and the antenna 901 in the communication device 900 shown in FIG. 13 may implement functions/implementation processes of the transceiver unit 1302 in FIG. 15. Alternatively, the processor 1001 in the communication device 1000 shown in FIG. 14 may invoke the computer-executable instructions stored in the memory 1004, to implement functions/implementation processes of the transceiver unit 1302 and the processing unit 1301 in FIG. 15. Alternatively, the processor 1001 in the communication device 1000 shown in FIG. 14 may invoke the computer-executable instructions stored in the memory 1004, to implement functions/implementation processes of the processing unit 1301 in FIG. 15, and the communication interface 1003 in the communication device 1000 shown in FIG. 14 may implement functions/implementation processes of the transceiver unit 1302 in FIG. 15.

Embodiment 14

This embodiment provides a communication apparatus that may be configured to implement, for example, a function of the relay terminal in Embodiment 1 to Embodiment 4 or the first terminal in Embodiment 6. In this embodiment of this application, the communication apparatus may be divided into functional units based on the foregoing method embodiment. For example, each functional unit may be obtained through division based on each corresponding function, or two or more units may be integrated into one processing module. The integrated unit may be implemented in a form of hardware, or may be implemented in a form of a software functional module. It should be noted that, in the embodiments of this application, division into the units is an example, and is merely logical function division. During actual implementation, another division manner may be used.

Figure 16:
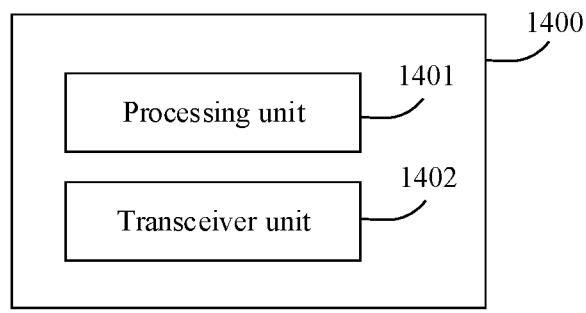
FIG. 16 is a schematic diagram of a structure of still another communication apparatus according to an embodiment of this application.

FIG. 16 is a schematic diagram of a structure of a communication apparatus 1400 according to an embodiment of this application. The communication apparatus 1400 includes a processing unit 1401 and a transceiver unit 1402.

Optionally, the processing unit 1401 is specifically used for a function of generating the broadcast decision information in S601.

Optionally, the processing unit 1401 is specifically used for a function of performing configuration based on the configuration message in S105, S206, S305, and S404.

Optionally, the processing unit 1401 is specifically used for a function of identifying the application message based on the configuration information in S108, S209, S308, and S406.

Optionally, the transceiver unit 1402 is specifically used for a function of sending the terminal capability information or the channel quality information in S101, S201, S301, S401, and S602.

Optionally, the transceiver unit 1402 is specifically used for a function of sending the mobility information in S102, S302, S402, and S602.

Optionally, the transceiver unit 1402 is specifically used for a function of receiving the configuration information in S105, S206, S305, S404, and S602.

Optionally, the transceiver unit 1402 is specifically used for a function of receiving the application message in S108, S209, S308, and S406.

Specifically, the processor in the communication device in Embodiment 11 may invoke the computer-executable instructions stored in the memory, to implement functions/implementation processes of the transceiver unit 1402 and the processing unit 1401 in FIG. 16. Alternatively, the processor in the communication device in Embodiment 11 may invoke the computer-executable instructions stored in the memory, to implement functions/implementation processes of the processing unit 1401 in FIG. 16, and the communication interface in the communication device in Embodiment 11 may implement functions/implementation processes of the transceiver unit 1402 in FIG. 16.

Embodiment 15

This embodiment provides a communication apparatus that may be configured to implement, for example, a function of the initiating terminal in Embodiment 1 to Embodiment 3 or the first terminal in Embodiment 7. In this embodiment of this application, the communication apparatus may be divided into functional units based on the foregoing method embodiment. For example, each functional unit may be obtained through division based on each corresponding function, or two or more units may be integrated into one processing module. The integrated unit may be implemented in a form of hardware, or may be implemented in a form of a software functional module. It should be noted that, in the embodiments of this application, division into the units is an example, and is merely logical function division. During actual implementation, another division manner may be used.

Figure 17:
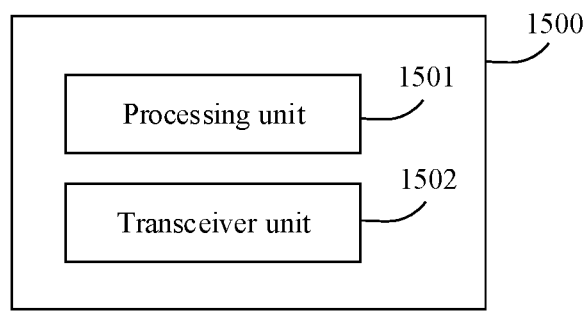
FIG. 17 is a schematic diagram of a structure of still another communication apparatus according to an embodiment of this application.

FIG. 17 is a schematic diagram of a structure of a communication apparatus 1500 according to an embodiment of this application. The communication apparatus 1500 includes a processing unit 1501 and a transceiver unit 1502.

Optionally, the processing unit 1501 is specifically used for a function of generating the application identifier, generating the transmission range of the application message, or generating the data flow identifier in S103, S202, S303, and S701.

Optionally, the processing unit 1501 is specifically used for a function of including the first identifier in the broadcast first data in S108, S209, S308, and S703.

Optionally, the transceiver unit 1502 is specifically used for a function of sending the terminal capability information or the channel quality information in S101, S201, and S301.

Optionally, the transceiver unit 1502 is specifically used for a function of sending the mobility information in S102 and S302.

Optionally, the transceiver unit 1502 is specifically used for a function of sending the first request in S103, S202, S303, and S702.

Optionally, the transceiver unit 1502 is specifically used for a function of broadcasting the first data in S108, S209, S308, and S703.

Specifically, the processor in the communication device in Embodiment 12 may invoke the computer-executable instructions stored in the memory, to implement functions/implementation processes of the transceiver unit 1502 and the processing unit 1501 in FIG. 17. Alternatively, the processor in the communication device in Embodiment 12 may invoke the computer-executable instructions stored in the memory, to implement functions/implementation processes of the processing unit 1501 in FIG. 17, and the communication interface in the communication device in Embodiment 12 may implement functions/implementation processes of the transceiver unit 1502 in FIG. 17.

It should be noted that functions of the initiating terminal and the relay terminal in this application may be implemented by one terminal device.

The apparatuses provided in the embodiments of this application may select the relay terminal with reference to the transmission range of the application message and locations of the terminals, and may select the relay terminal that matches the transmission range of the data in multi-hop broadcast. This can satisfy a broadcast coverage requirement, and can also avoid broadcast flooding, and reduce information redundancy, channel contention, or collision interference. An appropriate relay terminal can be more accurately selected by considering the connectivity between the terminals when the relay terminal is to be determined. The appropriate relay terminal can be more accurately selected by introducing a graph concept and algorithm to select the relay terminal. The appropriate relay terminal is accurately selected, so that a relatively small quantity of relay terminals can be used to satisfy the broadcast coverage requirement, and the relay terminal can implement a relay broadcast requirement by using a relatively low transmit power. Therefore, the information redundancy, the channel contention, or the collision interference is further reduced while the broadcast coverage requirement is satisfied.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In the embodiments of this application, the computer may include the foregoing apparatuses.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A broadcast method, comprising:
   obtaining, by a first apparatus, broadcast decision information of a plurality of first terminals, wherein the broadcast decision information comprises mobility information, and the mobility information indicates locations of the first terminals;
   determining, by the first apparatus, a second terminal in the plurality of first terminals based on the broadcast decision information and a first range, wherein the first range is a transmission range of first data; and
   sending, by the first apparatus, configuration information to the second terminal, wherein the configuration information indicates the second terminal to broadcast the first data.

2. The method according to claim 1, wherein the broadcast decision information further comprises terminal capability information, wherein the terminal capability information indicates communication coverage of the first terminals.

3. The method according to claim 2, wherein the terminal capability information comprises:
   the communication coverage of the first terminals; or
   transmit powers of the first terminals.

4. The method according to claim 1, wherein the broadcast decision information further comprises:
   channel quality information, wherein the channel quality information indicates channel quality between the plurality of first terminals.

5. The method according to claim 1, wherein the mobility information further comprises:
   movement directions or movement speeds of the first terminals.

6. The method according to claim 1, wherein the configuration information comprises a first identifier, and the first identifier identifies to-be-broadcast data; and the first data carries the first identifier.

7. The method according to claim 6, wherein the method further comprises:
   obtaining, by the first apparatus, the first identifier from a broadcast initiating terminal; or,
   allocating, by the first apparatus, the first identifier or obtaining the first identifier from a broadcast control network element; and sending, by the first apparatus, the first identifier to a broadcast initiating terminal.

8. The method according to claim 1, wherein the method further comprises:
   obtaining, by the first apparatus from the broadcast initiating terminal, information that indicates the first range.

9. The method according to claim 1, wherein the method further comprises:
   receiving, by the first apparatus, a first request from the broadcast initiating terminal, wherein the first request requests to broadcast the first data.

10. The method according to claim 1, wherein the method further comprises:
    obtaining, by the first apparatus, updated broadcast decision information;
    determining, by the first apparatus based on the updated broadcast decision information, whether to update the second terminal; and
    determining a new second terminal based on the updated broadcast decision information and the first range when the first apparatus determines to update the second terminal.

11. A communication apparatus, comprising:
    a transceiver;
    at least one processor; and
    one or more memories coupled to the at least one processor and storing programming instructions for execution by the at least one processor to cause the communication apparatus to:
    obtain broadcast decision information of a plurality of first terminals, wherein the broadcast decision information comprises mobility information, and the mobility information indicates locations of the first terminals;
    determine a second terminal in the plurality of first terminals based on the broadcast decision information and a first range, wherein the first range is a transmission range of first data; and
    send, by using the transceiver, configuration information to the second terminal, wherein the configuration information indicates the second terminal to broadcast the first data.

12. The communication apparatus according to claim 11, wherein the broadcast decision information further comprises terminal capability information, wherein the terminal capability information indicates communication coverage of the first terminals.

13. The communication apparatus according to claim 12, wherein the terminal capability information comprises:

the communication coverage of the first terminals; or transmit powers of the first terminals.

14. The communication apparatus according to claim 11, wherein the broadcast decision information further comprises:
channel quality information, wherein the channel quality information indicates channel quality between the plurality of first terminals.

15. The communication apparatus according to claim 11, wherein the mobility information further comprises:
movement directions or movement speeds of the first terminals.

16. The communication apparatus according to claim 11, wherein the configuration information comprises a first identifier, and the first identifier identifies to-be-broadcast data; and the first data carries the first identifier.

17. The communication apparatus according to claim 16, wherein the programming instructions, when executed by the at least one processor, cause the communication apparatus to:
obtain the first identifier from a broadcast initiating terminal; or
allocate the first identifier or obtaining the first identifier from a broadcast control network element; and send the first identifier to a broadcast initiating terminal.

18. The communication apparatus according to claim 11, wherein the programming instructions, when executed by the at least one processor, cause the communication apparatus to:
obtain from the broadcast initiating terminal, information that indicates the first range.

19. The communication apparatus according to claim 11, wherein the programming instructions, when executed by the at least one processor, cause the communication apparatus to:
receive a first request from the broadcast initiating terminal, wherein the first request requests to broadcast the first data.

20. The communication apparatus according to claim 11, wherein the programming instructions, when executed by the at least one processor, cause the communication apparatus to:
obtain updated broadcast decision information;
determine based on the updated broadcast decision information, whether to update the second terminal; and
determine a new second terminal based on the updated broadcast decision information and the first range when determining to update the second terminal.

* * * * *